US011914318B2

(12) United States Patent
Hiraide

(10) Patent No.: US 11,914,318 B2
(45) Date of Patent: Feb. 27, 2024

(54) IMAGE FORMING APPARATUS AND IMAGE FORMING METHOD

(71) Applicant: Oki Electric Industry Co., Ltd., Tokyo (JP)

(72) Inventor: Manami Hiraide, Tokyo (JP)

(73) Assignee: OKI Electric Industry Co., Ltd., Tokyo (JP)

( * ) Notice: Subject to any disclaimer, the term of this patent is extended or adjusted under 35 U.S.C. 154(b) by 542 days.

(21) Appl. No.: 17/151,791

(22) Filed: Jan. 19, 2021

(65) Prior Publication Data

US 2021/0232075 A1 Jul. 29, 2021

(30) Foreign Application Priority Data

Jan. 24, 2020 (JP) ................................ 2020-010168

(51) Int. Cl.
*G03G 15/22* (2006.01)
*G03G 15/01* (2006.01)
(Continued)

(52) U.S. Cl.
CPC .......... *G03G 15/22* (2013.01); *G03G 7/0093* (2013.01); *G03G 15/01* (2013.01);
(Continued)

(58) Field of Classification Search
CPC ............... G03G 13/0137; G03G 15/01; G03G 15/1605; G03G 15/22; G03G 15/6585; G03G 15/0121; G03G 15/0173; G03G 9/0902; G03G 9/0926; G03G 9/09708; G03G 9/09783; G03G 9/16; G03G 9/0781; G03G 7/0093; G03G 8/00; G03G 2215/0154; G03G 2215/00717; G03G 2215/00789; G03G 2215/00801; G03G 2215/00805
See application file for complete search history.

(56) References Cited

U.S. PATENT DOCUMENTS

2021/0232075 A1 * 7/2021 Hiraide .............. G03G 13/0137

FOREIGN PATENT DOCUMENTS

EP 0486235 A2 * 11/1991
JP 2019-082265 A 5/2019

OTHER PUBLICATIONS

English translation of JP2005-031339 (Year: 2005).*

* cited by examiner

*Primary Examiner* — Sonya M Sengupta
(74) *Attorney, Agent, or Firm* — Muncy, Geissler, Olds & Lowe, P.C.

(57) ABSTRACT

An image forming apparatus includes a first image forming part that forms a first image on a print medium using a photoluminescent developer containing a photoluminescent pigment; a second image forming part that forms a second image on the print medium using a coloring developer containing a coloring material; and a lamination part that laminates the first image and the second image on the print medium, wherein a viscoelastic phase angle (A) of the coloring developer and a viscoelastic phase angle (B) of the photoluminescent developer when measured at 125[° C.] using a viscoelasticity measuring device satisfy follow:

$$21.1[°] \leq (A\cdot B) \leq 31.6[°].$$

where

A means a viscoelastic phase angle of the coloring developer,

B means a viscoelastic phase angle of the photoluminescent developer.

12 Claims, 11 Drawing Sheets

(51) Int. Cl.
*G03G 15/16* (2006.01)
*G03G 7/00* (2006.01)
*G03G 9/09* (2006.01)
*G03G 9/097* (2006.01)

(52) U.S. Cl.
CPC ....... *G03G 15/1605* (2013.01); *G03G 9/0902* (2013.01); *G03G 9/09708* (2013.01); *G03G 9/09783* (2013.01)

(A: Developer Transfer Surface)

(B: Contact Surface)

*Fig. 5*

| | Status | Thermal Temp. | Reaching Temp. | Heating Rate | Thermal Time | Detection Time |
|---|---|---|---|---|---|---|
| | | °C | °C | °C/min. | min. | sec. |
| 1 | Thermal | 20 | 20 | 25 | 10 | 0.4 |
| 2 | Heating | 20 | 200 | 10 | 5 | 0.4 |

*Fig. 8A*
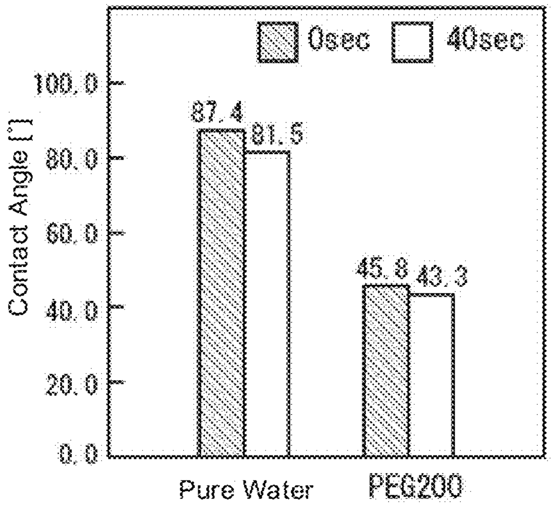
(A: Print Sheet)
*Fig. 8B*
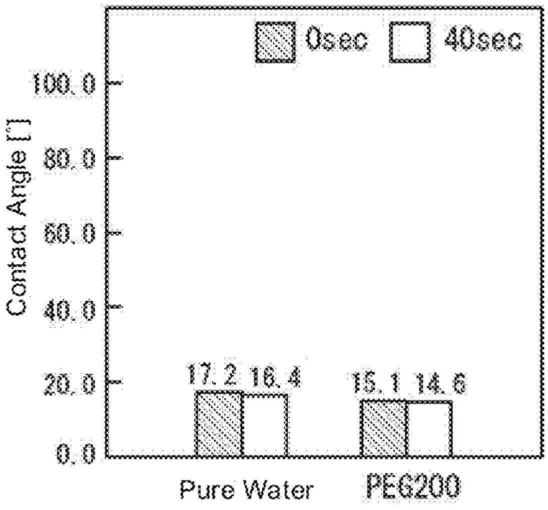
(B: OHP Sheet)
*Fig. 9*
| Developer | Phase Angle [°] At 125 [°C] |
|---|---|
| Photoluminescent Developer TSa | 40.2 |
| Photoluminescent Developer TSb | 36.4 |
| Photoluminescent Developer TSc | 46.5 |
| Yellow Developer TY1 | 68.0 |
| Magenta Developer TM1 | 64.1 |
| Cyan Developer TC1 | 61.7 |
| Black Developer TK1 | 62.5 |
| Yellow Developer TY2 | 61.3 |
| Magenta Developer TM2 | 49.2 |
| Cyan Developer TC2 | 55.1 |
| Black Developer TK2 | 57.3 |

*Fig. 10*

| Color Developer | | Photoluminescent Developer | | Phase Angle Difference [°] | Finish | Photoluminescence | Overall Evaluation |
|---|---|---|---|---|---|---|---|
| Developer | Phase Angle [°] At 125 [°C] | Developer | Phase Angle [°] At 125 [°C] | | | | |
| TY1 | 68.0 | TSa | 40.2 | 27.8 | ○ | ○ | ○ |
| TY1 | 68.0 | TSb | 36.4 | 31.6 | ○ | ○ | ○ |
| TY1 | 68.0 | TSc | 46.5 | 21.5 | ○ | △ | △ |
| TM1 | 64.1 | TSa | 40.2 | 23.9 | ○ | ○ | ○ |
| TM1 | 64.1 | TSb | 36.4 | 27.7 | ○ | ○ | ○ |
| TM1 | 64.1 | TSc | 46.5 | 17.6 | ○ | △ | △ |
| TC1 | 61.7 | TSa | 40.2 | 21.6 | ○ | ○ | ○ |
| TC1 | 61.7 | TSb | 36.4 | 25.4 | ○ | ○ | ○ |
| TC1 | 61.7 | TSc | 46.5 | 15.3 | ○ | △ | △ |
| TK1 | 62.5 | TSa | 40.2 | 22.3 | ○ | ○ | ○ |
| TK1 | 62.5 | TSb | 36.4 | 26.1 | ○ | ○ | ○ |
| TK1 | 62.5 | TSc | 46.5 | 16.0 | ○ | △ | △ |
| TY2 | 61.3 | TSa | 40.2 | 21.1 | △ | ○ | △ |
| TY2 | 61.3 | TSb | 36.4 | 24.9 | △ | ○ | △ |
| TY2 | 61.3 | TSc | 46.5 | 14.8 | △ | △ | × |
| TM2 | 49.2 | TSa | 40.2 | 9.0 | × | ○ | × |
| TM2 | 49.2 | TSb | 36.4 | 12.8 | × | ○ | × |
| TM2 | 49.2 | TSc | 46.5 | 2.7 | × | △ | × |
| TC2 | 55.1 | TSa | 40.2 | 14.9 | × | ○ | × |
| TC2 | 55.1 | TSb | 36.4 | 18.7 | × | ○ | × |
| TC2 | 55.1 | TSc | 46.5 | 8.6 | × | △ | × |
| TK2 | 57.3 | TSa | 40.2 | 17.2 | × | ○ | × |
| TK2 | 57.3 | TSb | 36.4 | 21.0 | × | ○ | × |
| TK2 | 57.3 | TSc | 46.5 | 10.8 | × | △ | × |

250
201
153
21
38
157C
157S
157
154
171
172
51
61
62
55

IMAGE FORMING APPARATUS AND IMAGE FORMING METHOD

TECHNICAL FIELD

This application relates to an image forming apparatus and an image forming method, and can be suitably applied to, for example, an electrophotographic printer.

BACKGROUND

Conventionally, an image forming apparatus (also referred to as a printer) has been widely used that performs a print process by forming a developer image with an image forming unit using a toner (also referred to as a developer) based on an image supplied from a computer device or the like, transferring the developer image to a medium such as a sheet of paper, and applying heat and pressure thereto to fuse the image. In the image forming apparatus, when general color printing is performed, for example, toners of respective colors such as cyan, magenta, yellow and black (hereinafter these are referred to as color toners) are used.

Further, in some image forming apparatuses, a highly photoluminescent image having a metallic luster is formed on a medium such as a sheet of paper by superimposing a photoluminescent toner containing a metal pigment such as aluminum on a color toner (see, for example, Patent Document 1).

RELATED ART

Patent Document(s)

[Patent Doc. 1] JP Laid-Open Patent Application Publication 2019-082265

Objects to be Solved

Further, in recent years, an image forming apparatus is demanded to perform print processing on various media. As an example, an image forming apparatus is demanded to perform print processing, that is, to transfer a developer image to and fuse the developer image onto a fabric medium such as a T-shirt (hereinafter, this is also referred to as a special medium).

This application is accomplished in consideration of the above problem and is intended to propose an image forming apparatus and an image forming method that allow image quality of an image transferred to a special medium to be improved.

SUMMARY

An image forming apparatus, disclosed in the application, includes a first image forming part that forms a first image on a print medium using a photoluminescent developer containing a photoluminescent pigment; a second image forming part that forms a second image on the print medium using a coloring developer containing a coloring material; and a lamination part that laminates the first image and the second image on the print medium, wherein a viscoelastic phase angle (A) of the coloring developer and a viscoelastic phase angle (B) of the photoluminescent developer when measured at 125[° C.] using a viscoelasticity measuring device satisfy follow:

$$21.1[°] \leq (A\cdot B) \leq 31.6[°].$$

where

A means a viscoelastic phase angle of the coloring developer,

B means a viscoelastic phase angle of the photoluminescent developer.

An image forming method, disclosed in the application, includes an image forming step in which a developer image is formed by an image forming apparatus and the developer image is transferred to a transfer surface of a print medium on which an adhesive layer is formed; a first transfer step in which, in a state where an intermediate transfer medium is placed on a side of the transfer surface of the print medium onto which the developer image has been transferred, the developer image and the adhesive layer are transferred to the intermediate transfer medium by applying heat and pressure using a heating and pressing device; and a second transfer step in which, in a state where a surface of the intermediate transfer medium onto which the developer image and the adhesive layer have been transferred faces a special medium, the developer image and the adhesive layer are transferred to the special medium by applying heat and pressure using the heating and pressing device, wherein the image forming step further includes: a developer image forming step in which a first image is formed on the print medium using a photoluminescent developer containing a photoluminescent pigment, and a second image is formed on the print medium using a coloring developer containing a coloring material; and a developer image transfer step in which the first image and the second image are transferred onto the print medium, and a viscoelastic phase angle (A) of the coloring developer and a viscoelastic phase angle (B) of the photoluminescent developer when measured at 125[° C.] using a viscoelasticity measuring device satisfy follow:

$$21.1[°] \leq (A\cdot B) \leq 31.6[°].$$

where

A means a viscoelastic phase angle of the coloring developer,

B means a viscoelastic phase angle of the photoluminescent developer.

According to the application, in the iron press process, the coloring developer layer can be easily held in gaps at the interface of the photoluminescent developer layer which is uneven, and, when the print medium is peeled off from the intermediate transfer medium, the developer image and the adhesive layer can be satisfactorily transferred to the intermediate transfer medium without causing a scale-like pattern to occur in the developer image, and further, the image can be transferred to the special medium.

According to the application, an image forming apparatus and an image forming method that allow image quality of an image transferred to a special medium to be improved can be realized.

BRIEF DESCRIPTION OF THE DRAWINGS

FIG. 5 shows DSC measurement conditions.

FIGS. 8A and 8B show wettability measurement results of various media.

FIG. 9 is a table showing phase angle measurement results of developers.

FIG. 10 is a table showing measurement and evaluation results of developers.

DETAILED DESCRIPTION OF THE PREFERRED EMBODIMENT(S)

In the following, modes for carrying out embodiments (hereinafter referred to as embodiments) are described using the drawings.

1. First Embodiment

1-1. Configuration of Image Forming Apparatus

Figure 1:
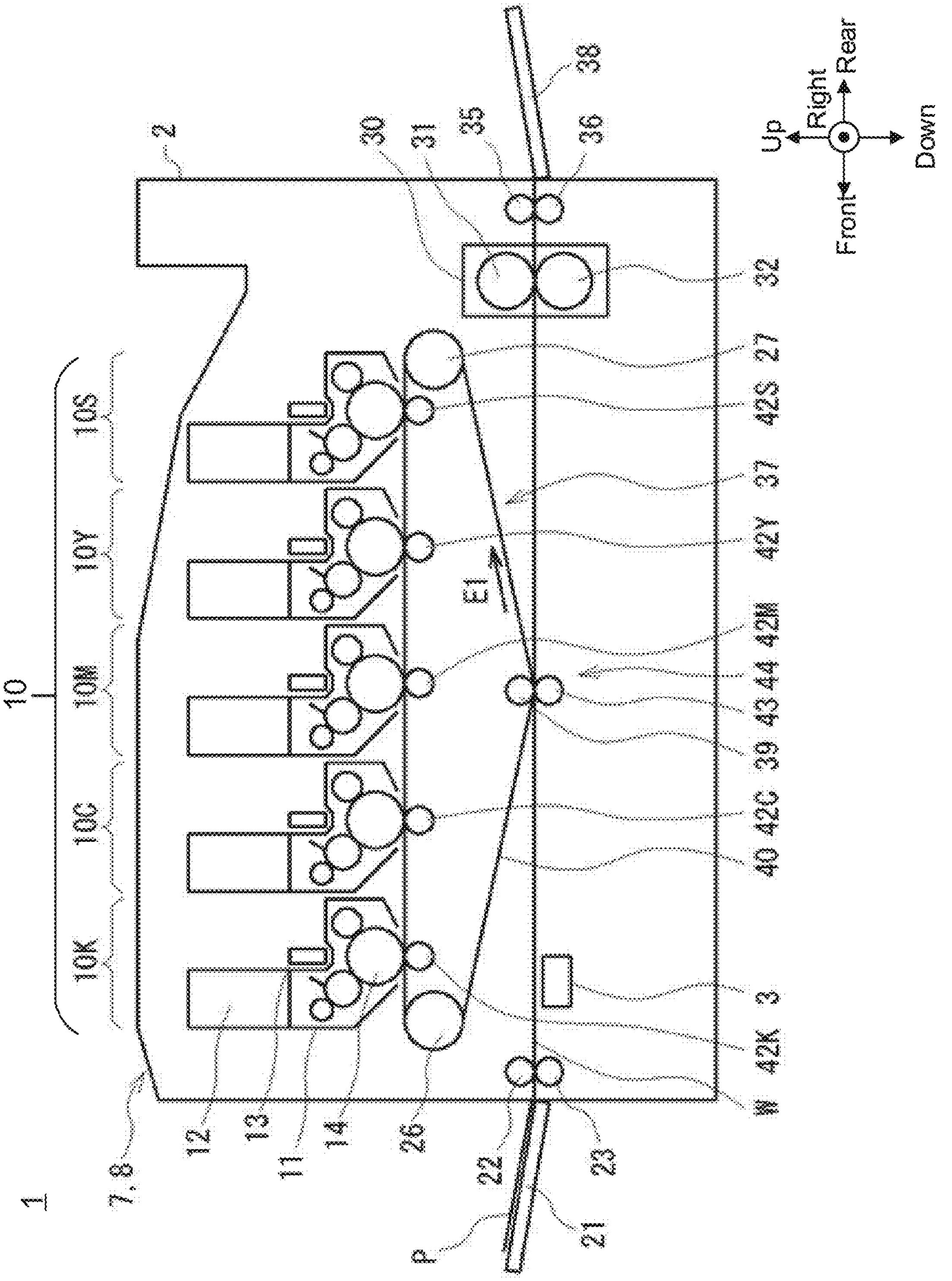
FIG. 1 is a right side view illustrating a configuration of an image forming apparatus according to a first embodiment.

As illustrated in FIG. 1, an image forming apparatus 1 according to the present embodiment is an electrophotographic printer, and can form (that is, print) a color image on a sheet P as a medium. The image forming apparatus 1 is a single-function printer (SFP) that does not have an image scanner function for reading a document or a communication function using a telephone line, but has only a printer function.

Various components are arranged inside a substantially box-shaped printer case 2 of the image forming apparatus 1. In the following, description is present by defining the left side in FIG. 1 as a front side of the image forming apparatus 1 and respectively defining an up-down direction, a left-right direction and a front-rear direction as those directions when the image forming apparatus 1 is viewed from the front side.

The image forming apparatus 1 is overall controlled by a control part 3. The control part 3 has a CPU (Central Processing Unit), a ROM (Read Only Memory), a RAM (Random Access Memory), and the like (which are not illustrated in the drawings), and executes various processes by reading out and executing a predetermined program. Further, the control part 3 is connected to a host device (not illustrated in the drawings) such as a computer device wirelessly or by wire. When image data representing an image to be printed is received from the host device and printing of the image data is instructed, the control part 3 executes a print process in which a printed image is formed on a surface of a sheet P.

On a front side of an upper surface of the printer case 2, a display part 7 and an operation part 8 are provided. The display part 7 is, for example, a display device such as a liquid crystal panel, and displays information using characters, images or the like based on the control of the control part 3. The operation part 8 includes a combination of multiple operation buttons such as direction buttons, an OK button and a cancel button, and receives an operation instruction from a user and notifies the control part 3 of the operation instruction.

A carrying path W is formed inside the printer case 2 slightly below a center thereof, approximately along the front-rear direction. Inside the printer case 2, various members are arranged along the carrying path W. Therefore, in the image forming apparatus 1, an image is formed (that is, printed) on a sheet P while the sheet P is carried along the carrying path W.

In particular, the control part 3 controls a positional relationship between a first image formed by an image forming unit 10S as a first image forming part (to be described later) and a second image formed by image forming units 10K, 10C, 10M and 10Y as a second image forming part.

Specifically, for example, when an intermediate transfer belt 40 is used to form an image, as will be described later, the control part 3 laminates the first image and the second image on the intermediate transfer belt 40. The image forming units 10 (10S, 10K, 10C, 10M and 10Y), a secondary transfer part 44 and the control part 3 correspond to "image forming part and lamination part" of an embodiment of the application.

On an upper side inside the printer case 2, that is, on an upper side of the carrying path W, the five image forming units 10K, 10C, 10M, 10Y and 10S are arranged in this order from a front side to a rear side. The image forming units 10K, 10C, 10M, 10Y and 10S respectively correspond to colors of black (K), cyan (C), magenta (M), yellow (Y) and a special color (S), and are different from each other only in color, and are all configured in the same way.

The black (K), cyan (C), magenta (M) and yellow (Y) colors that form the second image are all colors used in a general color printer (hereinafter, these colors are referred to as normal colors). On the other hand, the special color (S) is a special color such as a white color, a clear (transparent or colorless) color, or a silver color that forms the first image. For convenience of description, in the following, the image forming units 10K, 10C, 10M, 10Y as the second image forming part that forms the second image and the image forming unit 10S as the first image forming part that forms the first image are also collectively referred to as the image forming units 10.

The image forming units 10 each include an image forming main body 11, a toner cartridge 12 and a print head 13. Multiple rollers such as a development roller, a photosensitive drum 14, and the like are incorporated inside the image forming main body 11. The rollers and the photosensitive drum 14 are all formed in columnar shapes with central axes along the left-right direction, and are rotatably supported by the image forming main body 11. A vicinity (or a portion facing downward) of a lower end of the photosensitive drum 14 is in contact with the intermediate transfer belt 40. Further, some of the rollers are formed of conductive materials and a predetermined high voltage is applied.

The toner cartridge 12 contains a toner as a developer and is attached to an upper side of the image forming main body 11. The toner cartridge 12 supplies the toner contained therein to the image forming main body 11. The print head 13 has multiple light emitting elements such as LEDs (Light Emitting Diodes) arranged along the left-right direction, and emits light as appropriate based on bitmap data supplied from the control part 3.

When a print process is performed, each of the image forming units 10 causes the print head 13 to emit light as appropriate while rotating the rollers, the photosensitive drum or the like of the image forming main body 11 and applying a predetermined high voltage to the rollers or the like. As a result, each of the image forming units 10 forms a toner image as a developer image on a peripheral side surface of the photosensitive drum 14 while using the developer supplied from the toner cartridge 12. In this case, the photosensitive drum 14 rotates to move the formed developer image to the vicinity of the lower end thereof, that is, near the intermediate transfer belt 40.

On the other hand, on the front side of the printer case 2, a sheet feeding tray 21 is provided. The sheet feeding tray 21 is formed in a substantially flat plate shape, and an upper surface of the sheet feeding tray 21 is formed substantially flat. The upper surface of the sheet feeding tray 21 is inclined with respect to the horizontal direction so that a rear side thereof is positioned slightly lower, and a rear end of the sheet feeding tray 21 is substantially positioned at the same height as the carrying path W. On an upper side of the sheet feeding tray 21, a sheet P is placed in a posture in which a printed surface on which printing is to be performed faces upward. Further, multiple sheets P are stacked on the sheet feeding tray 21.

On the rear side of the sheet feeding tray 21, registration rollers 22 and 23 are respectively arranged on an upper side and a lower side of the carrying path W. The registration rollers 22 and 23 are each formed in a columnar shape with a central axis along the left-right direction, and peripheral side surfaces of the registration rollers 22 and 23 are in contact with each other at the carrying path W. The registration rollers 22 and 23 rotate appropriately when a driving force is supplied from a motor (not illustrated in the drawings), and carry the sheets P placed on the sheet feeding tray 21 rearward while separating the sheets P one by one.

The registration rollers 22 and 23 are each appropriately suppressed in rotation, and, by applying a frictional force to a sheet P, correct a so-called skew in which lateral sides of the sheet P are tilted with respect to a movement direction, and feed the sheet P rearward after a leading edge and a trailing edge of the sheet P are aligned along the left-right direction.

An intermediate transfer part 37 is arranged on a lower side of the image forming units 10 in the printer case 2. In the intermediate transfer part 37, a front carrying roller 26, a rear carrying roller 27, a backup roller 39, the intermediate transfer belt 40, five primary transfer rollers 42 (42K, 42C, 42M, 42Y and 42S), and a secondary transfer roller 43 are provided. Among these, the front carrying roller 26, the rear carrying roller 27, the backup roller 39, the five primary transfer rollers 42 (42K, 42C, 42M, 42Y and 42S) and the secondary transfer roller 43 are all formed in columnar shapes with central axes along the left-right direction, and are rotatably supported by the printer case 2. For convenience of description, in the following, the primary transfer roller 42K, 42C, 42M, 42Y and 42S are also collectively referred to as the primary transfer rollers 42.

In this embodiment, a developed image formed with the first image forming part ($\mathbf{10}_S$) and another developed image formed with the second image forming parts (10K, 10C, 10M and 10Y) are laminated on the intermediate transfer part 37. The part 37 functions as a lamination part of the invention.

The front carrying roller 26 is arranged on a lower front side of the image forming unit 10K. The rear carrying roller 27 is arranged on a lower rear side of the image forming unit OS. An upper end of the front carrying roller 26 and an upper end of the rear carrying roller 27 are positioned at the same height as or slight below lower ends of the photosensitive drums 14 in the image forming units 10. The backup roller 39 is arranged on a lower rear side of the front carrying roller 26 and a lower front side of the rear carrying roller 27.

The intermediate transfer belt 40 is an endless belt formed of a high-resistance plastic film, and is stretched so as to move around the front carrying roller 26, the rear carrying roller 27 and the backup roller 39. Further, in the intermediate transfer part 37, on a lower side of a portion of the intermediate transfer belt 40 stretched between the front carrying roller 26 and the rear carrying roller 27, that is, at positions that are respectively directly below the five image forming units 10, the five primary transfer rollers 42 are respectively arranged at positions opposing the photosensitive drums 14 with the intermediate transfer belt 40 sandwiched therebetween. A predetermined bias voltage is applied to each of the primary transfer rollers 42.

The secondary transfer roller 43 is positioned directly below the backup roller 39 and is biased toward the backup roller 39. That is, in the intermediate transfer part 37, the intermediate transfer belt 40 is sandwiched between the secondary transfer roller 43 and the backup roller 39. Further, a predetermined bias voltage is applied to the secondary transfer roller 43. In the following, the secondary transfer roller 43 and backup roller 39 are collectively referred to as the secondary transfer part 44.

In the intermediate transfer part 37, the front carrying roller 26 is rotated by a driving force supplied from a belt motor (not illustrated in the drawings), and thereby, the intermediate transfer belt 40 moves in a direction along an arrow E1. Further, each of the primary transfer rollers 42 rotates with a predetermined bias voltage applied thereto. As a result, in the image forming units 10, developer images that have reached vicinities of the lower ends of the peripheral side surfaces of the photosensitive drums 14 can each be transferred to the intermediate transfer belt 40 and the developer images of the respective colors can be sequentially superimposed. In this case, the developer images of the respective colors are superimposed on a surface of the intermediate transfer belt 40 sequentially from the developer image of the silver (S) color on an upstream side.

That is, in the image forming apparatus 1, the developer images of the respective colors from the image forming units 10S, 10Y, 10M, 10C and 10K (that is, a photoluminescent developer image, a yellow developer image, a magenta developer image, a cyan developer image and a black developer image) are sequentially transferred. Therefore, when the developer images are transferred to the same position on the intermediate transfer belt 40 by the image forming units 10, the silver (S), yellow (Y), magenta (M), cyan (C) and black (K) developers are sequentially superimposed on a surface of a transfer surface. For convenience of description, in the following, the yellow developer image, the magenta developer image, the cyan developer image, and the black developer image are collectively referred to as a color developer image.

In the secondary transfer part 44, the developer images that are formed in the image forming units 10 and are transferred to the intermediate transfer belt 40 become close to each other as the intermediate transfer belt 40 moves, and a predetermined bias voltage is applied to the secondary transfer roller 43. Therefore, the secondary transfer part 44 transfers the developer image from the intermediate transfer belt 40 to a sheet P carried along the carrying path W, and further causes the sheet P to advance rearward. Therefore, when the developer images are transferred to the same position on the sheet P by the intermediate transfer belt 40, the black (K), cyan (C), magenta (M), yellow (Y) and silver (S) developers are sequentially superimposed on a surface of a printed surface.

A fuser 30 is arranged on a rear side of the secondary transfer part 44. The fuser 30 includes a heating roller 31 and a pressing rollers 32 arranged so as to oppose each other across the carrying path W. The heating roller 31 is formed in a cylindrical shape with a central axis oriented in the left-right direction, and a heater is provided therein. The pressing roller 32 is formed in a cylindrical shape similar to the heating roller 31, and an upper surface thereof is pressed against a lower surface of the heating roller 31 with a predetermined pressing force.

Based on the control of the control part 3, the fuser 30 heats the heating roller 31 and respectively rotates the heating roller 31 and the pressing roller 32 in predetermined directions. As a result, the fuser 30 applies heat and pressure to the sheet P received from the intermediate transfer part 37, that is, the sheet P onto which the developer images of the respective colors have been superimposed and transferred to fuse the developers, and further carries the sheet P rearward.

On a rear side and a slightly upper side of the fuser 30, sheet ejection rollers 35 and 36 are arranged. The sheet ejection rollers 35 and 36 are both formed in columnar shapes with central axes along the left-right direction, and peripheral side surfaces of the sheet ejection rollers 35 and 36 are in contact with each other at the carrying path W. The sheet ejection rollers 35 and 36 rotate appropriately according to the control of the control part 3, and thereby, carry the sheet P received from the fuser 30 rearward and upward, and eject the sheet P onto a sheet ejection tray 38 provided on a rear side of the printer case 2.

In this way, in the image forming apparatus 1, developer images using developers are formed in the image forming units 10 and are transferred to the intermediate transfer belt 40; the developer images are transferred from the intermediate transfer belt 40 to the sheet P in secondary transfer part 44; and further, by fusing the developer images in the fuser 30, an image is printed (that is, an image is formed) on the sheet P.

1-2. Composition of Color Developer

Next, a composition of a color developer is described. A color developer is obtained by adding an external additive such as an inorganic fine powder or an organic fine powder (hereinafter, this is referred to as an external additive) to toner base particles containing at least a binding resin (also referred to as a binder resin). A release agent, a coloring agent, and the like are added to the binding resin. Further, other additives such as a charge control agent, a conductivity modifier, a fluidity improver, or a cleanability improver may be appropriately added to the binding resin, or a mixture of multiple types of additives may be added. In the present embodiment, as binding resins, a styrene acrylic copolymer resin, and a crystalline polyester resin having a crystalline structure in addition to multiple amorphous polyester resins, are used.

Color developers that each use a styrene acrylic copolymer resin as a binding resin are a yellow developer TY1, a magenta developer TM1, a cyan developer TC1, and a black developer TK1 depending on differences of respective coloring agents thereof. Further, color developers that each use a crystalline polyester resin having a crystalline structure in addition to multiple amorphous polyester resins is used as a binding resin are a yellow developer TY2, a magenta developer TM2, a cyan developer TC2, and a black developer TK2 depending on differences of respective coloring agents thereof.

Further, it is further preferable that a photoluminescent developer (hereinafter also referred to as a silver developer) and a color developer respectively use base resins having different main components. In the present embodiment, polyester is used as a main component of a base resin of a photoluminescent developer, and styrene-acrylic is used as a main component of a base resin of a color developer.

A toner described in the present embodiment is a negatively charged toner of a one-component development method. That is, the toner has, for example, a negative charging polarity. The one-component development method is a method in which an appropriate amount of charge is imparted to a toner itself without using a carrier (magnetic particles) for imparting charge to the toner.

1-3. Manufacture of Developer

Next, manufacture of the developer contained in the toner cartridge 12 of the image forming unit 10S (FIG. 1) is described. In the present embodiment, in particular, manufacture of a silver developer is described.

1-3-1. Example 1

In Example 1, first, an aqueous medium is generated in which an inorganic dispersing agent is dispersed. Specifically, 920 parts by weight of industrial trisodium phosphate dodecahydrate is mixed with 27000 parts by weight of pure water, and, after the industrial trisodium phosphate dodecahydrate is dissolved at a liquid temperature of 60[° C.], a dilute nitric acid for pH (hydrogen ion index) adjustment is added. To this aqueous solution, a calcium chloride aqueous solution obtained by dissolving 440 parts by weight of industrial calcium chloride anhydride in 4500 parts by weight of pure water is added, and, while the liquid temperature is maintained at 60[° C.], the mixture is stirred using a line mill (manufactured by Primix Corporation) at a high rotation speed of 3566 [rpm] for 34 minutes. As a result, an aqueous phase, which is an aqueous medium in which a suspension stabilizer (inorganic dispersing agent) is dispersed, is prepared.

Further, in Example 1, a pigment-dispersed oil-based medium is generated in a process of preparing a resin solution. Specifically, a pigment dispersion liquid is prepared by mixing 395 parts by weight of a photoluminescent pigment (having a volume median diameter of 5.4 [μm]) and 60 parts by weight of a charge control agent (BONTRON E-84,1 manufactured by Orient Chemical Industry Co., Ltd.) with 7430 parts by weight of ethyl acetate which is an organic solvent. Among these, the photoluminescent pigment contains small flakes of aluminum (Al), that is, flaky, flat or scaly flakes. In the following, the photoluminescent pigment is also referred to as an aluminum pigment, a metal pigment, or a silver developer pigment.

After that, the pigment dispersion liquid is stirred while a liquid temperature is maintained at 50[° C.], and 60 parts by weight of a charge control resin (FCA-726N: manufactured by Fujikura Kasei Co., Ltd.), 150 parts by weight of an ester wax (WE-4: manufactured by NOF Corporation) as a release agent, and 1310 parts by weight of a polyester resin as a binder resin are added, and the mixture is stirred until there are no solid substances. As a result, an oil phase, which is a pigment-dispersed oil-based medium, is prepared.

Next, the oil phase is added to the aqueous phase of which a liquid temperature is maintained at 60[° C.], and the mixture is stirred at a rotation speed of 1000 [rpm] for 5 minutes as a granulation condition, and thereby, a suspension is formed and particles are formed in the suspension. Next, the suspension is distilled under a reduced pressure to remove ethyl acetate to forma slurry containing a developer. Next, a nitric acid is added to the slurry to bring the pH (hydrogen ion index) thereof to 1.6 or less, and the mixture is stirred to dissolve tricalcium phosphate which is a suspension stabilizer, and a developer is formed by dehydration. Subsequently, the dehydrated developer is redispersed in pure water, and the solution is stirred, and washing with water is performed. After that, toner base particles are generated by performing a dehydration process, a drying process, and a classification process.

As an external addition process, 1.0 [weight %] of small silica (RY200: manufactured by Nippon Aerosil Co., Ltd.) and 1.5 [weight %] of colloidal silica (X24-9163A: manufactured by Shin-Etsu Chemical Co., Ltd.) are added to and mixed with the toner base particles generated as described above to obtain a photoluminescent developer TSa.

1-3-2. Example 2

In Example 2, a photoluminescent developer TSb is obtained by following substantially the same procedures as Example 1 but changing the amount of the photoluminescent pigment to 593 parts by weight.

1-3-3. Example 3

In Example 3, a photoluminescent developer TSc is obtained by following substantially the same procedures as Example 1 but changing the volume median diameter of the photoluminescent pigment to 8.7 [μm]. In the following, the photoluminescent developers TSa, TSb and TSc are also collectively referred to as photoluminescent developers TS.

1-4. Special Medium Printing System and Configurations of Various Media

Figure 2A:
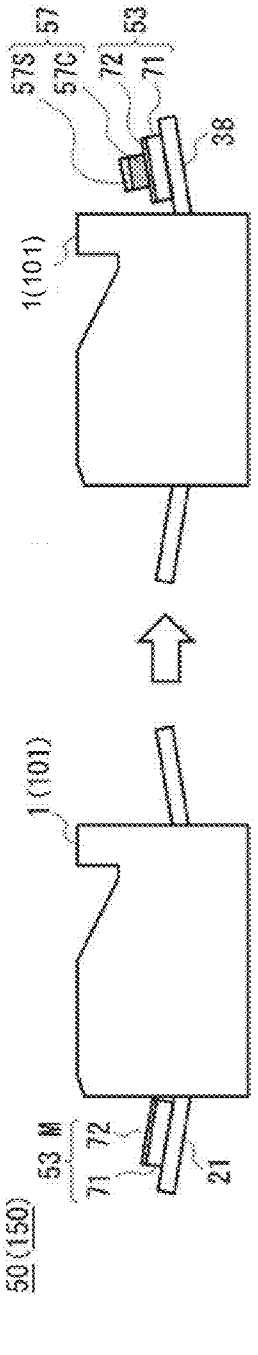
FIGS. 2A-2C illustrate printing of an image by a special medium printing system.
Figure 2B:
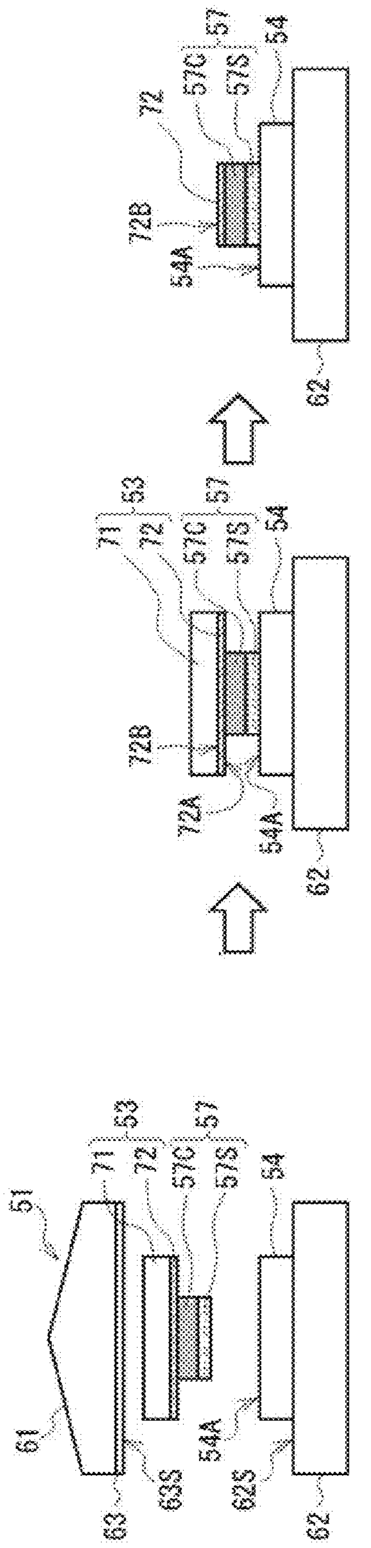
Figure 2C:
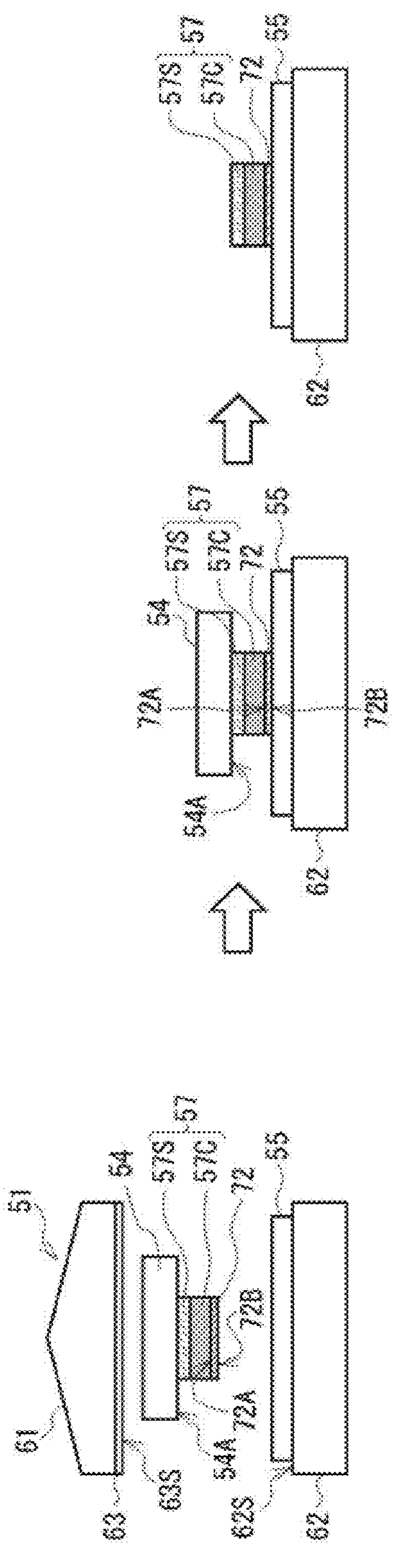

Next, formation, that is, printing, of an image by a special medium printing system 50 is described. As illustrated in FIGS. 2A, 2B and 2C, the special medium printing system 50 includes the above-described image forming apparatus 1 and an iron press device 51, and an M sheet 53, a T sheet 54 and a special medium 55 are used as media.

1-4-1. Configuration of Iron Press Device

As the iron press device 51 as a heating and pressing device, for example, HTP 234 PSi manufactured by The Magic Touch Corporation can be used. As illustrated in FIGS. 2B and 2C, the iron press device 51 includes an iron upper part 61 on an upper side and an iron lower part 62 on a lower side.

A heat source 63 is incorporated in a lower part of the iron upper part 61. In the heat source 63, a heat generation surface 63S, which is a lower surface of the heat source 63, is formed flat and can generate heat. In the iron press device 51, heat generation in the heat source 63 can be adjusted so that the heat generation surface 63S has a desired temperature. An upper surface 62S of the iron lower part 62 is a portion on which a medium is placed, and is formed flat.

Further, in the iron press device 51, a displacement mechanism (not illustrated in the drawings) can displace the iron upper part 61 with respect to the iron lower part 62 in the up-down direction in a posture in which the heat generation surface 63S of the heat source 63, which is a lower surface of the iron upper part 61, opposes the upper surface 62S of the iron lower part 62. As a result, in the iron press device 51, the iron upper part 61 can be pulled upward away from the iron lower part 62, or the iron upper part 61 can be pressed against the iron lower part 62. Further, in the iron press device 51, a pressure at which the iron upper part 61 is pressed against the iron lower part 62 can be set to a desired value.

1-4-2. Configurations of Various Media

Figure 3A:
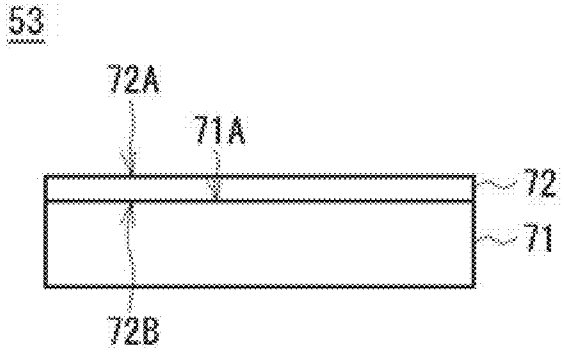
FIGS. 3A and 3B illustrate configurations of an M sheet and a T sheet.

The M sheet 53 as a print medium as a special medium used in iron transfer (also referred to as an iron transfer medium or a transfer medium) is, for example, an M sheet of a dark-colored fabric transfer sheet WoW7.8 manufactured by The Magic Touch Corporation, and, as illustrated in the schematic side view of FIG. 3A, is formed by laminating an adhesive layer 72 on amount 71. The M sheet 53 has an overall thickness of about 120.5 [μm], the mount 71 has a thickness of about 80.5 [μm], and the adhesive layer 72 has a thickness of about 40.0 [μm].

The mount 71 as a base material is a sheet of paper that is relatively thick and has a sufficient rigidity, a surface (hereinafter, this is referred to as a peeling surface 71A), which is a surface on an upper side in the drawing and is a surface on which the adhesive layer 72 is laminated, is coated with a fat material (hereinafter, this is also referred to as a release agent). That is, similar to a mount of a general label sheet, the mount 71 allows an adhesive medium to be easily peeled off.

The adhesive layer 72 is formed of an adhesive material. A contact surface 72B of the adhesive layer 72, which is a surface on a lower side in the drawing, is in contact with the peeling surface 71A of the mount 71, and a developer image is transferred to a developer transfer surface 72A, which is a surface on an upper side in the drawing (details to be described later). For convenience of description, in the following, the developer transfer surface 72A is also referred to as a transfer surface of the M sheet 53. Further, the contact surface 72B is also referred to as a base material contact surface.

Figure 4A:
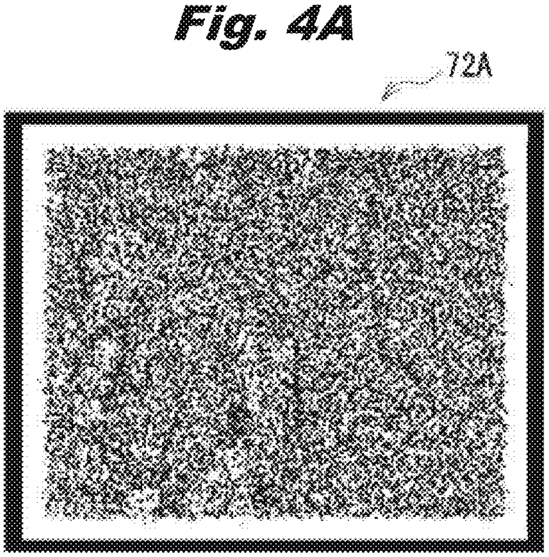
FIGS. 4A and 4B illustrate surface states of an adhesive layer.
Figure 4B:
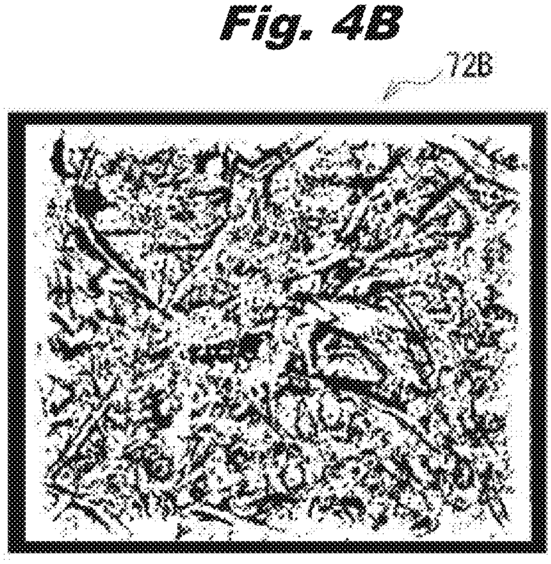

Here, the developer transfer surface 72A and the contact surface 72B of the adhesive layer 72 were observed with an optical microscope and images were captured, images as illustrated in FIGS. 4A and 4B were obtained. For convenience of preparing the drawings, FIGS. 4A and 4B illustrate monochrome images converted from the captured color images by subjecting the color images to binarization or the like. From the images, it can be seen that the developer transfer surface 72A of the adhesive layer 72 is relatively smoothly formed, whereas the contact surface 72B is relatively roughly formed, that is, the contact surface 72B has a larger surface roughness than the developer transfer surface 72A.

Figure 6:
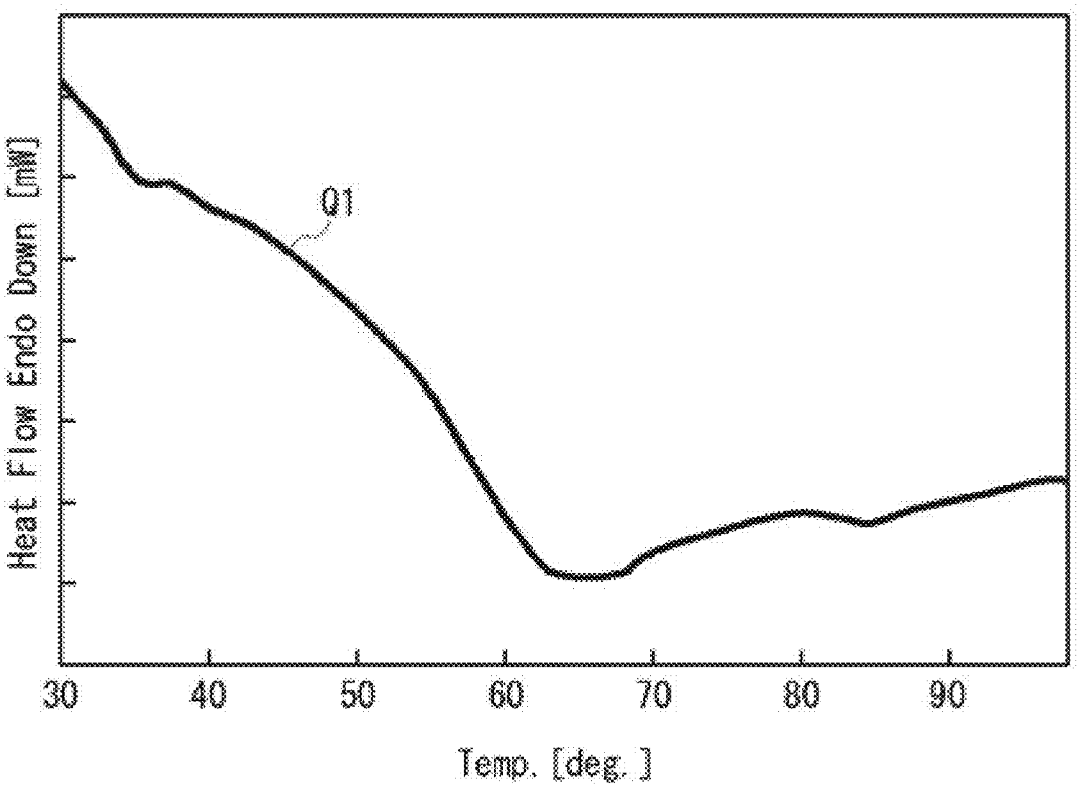
FIG. 6 shows DSC measurement results of an adhesive layer of the M sheet.

Further, regarding the adhesive layer 72, thermal characteristics were measured by performing a differential scanning calorimetry (DSC) measurement according to the measurement conditions shown in FIG. 5 using a thermal analysis system DSC6220 manufactured by Seiko Instruments Inc., and, as a result of the measurement, a characteristic curve Q1 as illustrated in FIG. 6 was obtained. The characteristic curve Q1 shows an endothermic peak near 65[° C.]. From this, it can be seen that the adhesive layer 72 is a substance of which a molecular structure changes due to heating.

(Definitions of Reaching Temp. and Thermal Time)

A product code DSC6220, which is manufactured by Hitachi High-Tech Corporation, is used as a differential scanning calorimetry. A sample (adhesive layer 72) of 0.01 to 0.02 [g] was weighed on an aluminum pan, sealed with a special jig, and a measurement was performed. Here, the measurement conditions of endothermic characteristics by the differential scanning calorimetry shown in FIG. 5, that is, a temperature programming pattern of the differential scanning calorimetry are as follow.

First, the sample sealed in the aluminum pan was kept in a warm state at 20[° C.] for 10 minutes.

Next, it was heated to 200[° C.] at a heating rate of 10[° C./min.], and the developer sealed in the aluminum pan was left at 200[° C.] for 5 minutes.

Next, the sample was cooled to 0[° C.] at a temperature lowering rate of 90[° C./min.], and the sample was left at 0[° C.] for 5 minutes.

Further, after being left at 0[° C.] for 5 minutes, the sample was heated to 20[° C.] at a heating rate of 60[° C./min.].

Figure 7A:
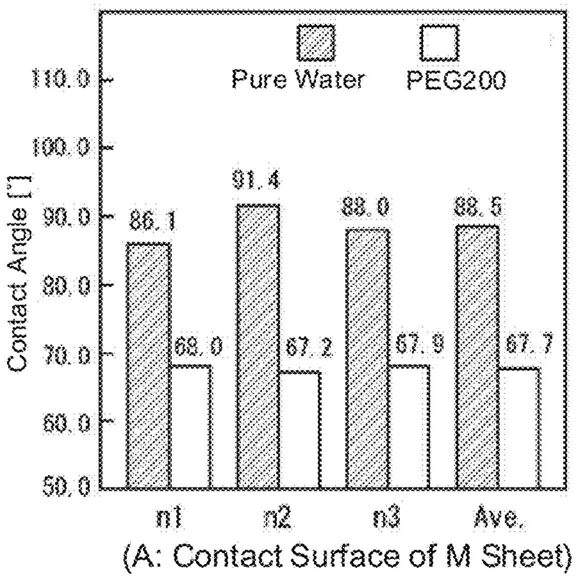
FIGS. 7A and 7B show wettability measurement results.

Further, regarding the adhesive layer 72, wettability was measured using three specimens (n1, n2 and n3), and, as illustrated in FIG. 7A, a contact angle of pure water was 86.1-91.4[°], and a contact angle of polyethylene glycol 200 (hereinafter referred to as PEG200) was 67.2-68.0[°]. From this, it is inferred that the adhesive layer 72 is (or made of) a lipophilic substance.

Figure 3B:
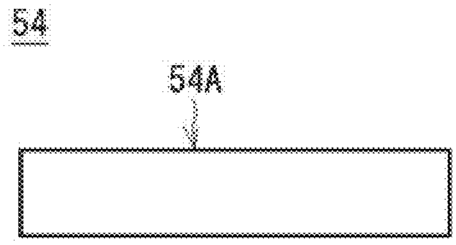
Figure 7B:
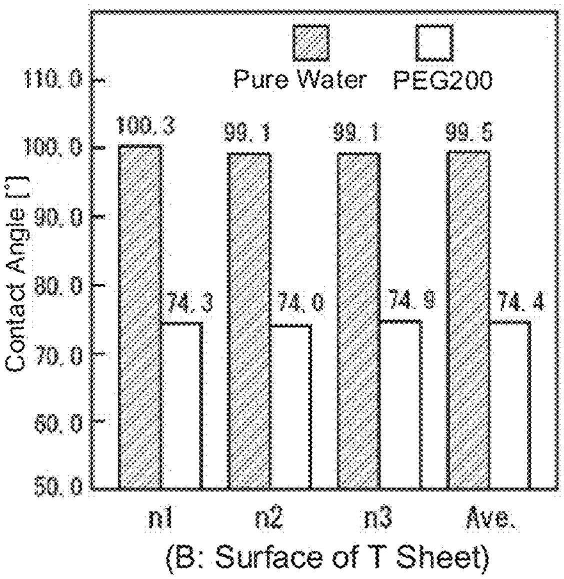

Similar to the M sheet 53, the T sheet 54 (FIGS. 2A-2C) as an intermediate transfer medium is a T sheet of a dark-colored fabric transfer sheet WoW7.8 manufactured by The Magic Touch Corporation, and, as illustrated in the schematic side view of FIG. 3B, is formed of a substantially uniform material. Regarding the T sheet 54, wettability of a surface 54A thereof was measured using three specimens (n1, n2 and n3), and, as illustrated in FIG. 7B, a contact angle of pure water was 99.1-101.3[°], and a contact angle of PEG200 was 74.0-74.9[°]. That is, the surface 54A of the T sheet 54 has lower hydrophilicity and lipophilicity than the adhesive layer 72 of the M sheet 53. From this, it is thought that a release layer is likely has been formed on the surface 54A of the T sheet 54 by coating with a release agent.

Further, also regarding a general print sheet PS and an OHP (Over Head Projector) sheet OS, which is a transparent resin sheet, similarly, wettability was measured using pure water and PEG200, and measurement results as shown in FIGS. 8A and 8B were obtained. Here, an Excellent White A4 sheet manufactured by Oki Data Corporation was used as the print sheet PS, and an OHP film CG3500 (A4 size) manufactured by 3M Corporation was used as the OHP sheet OS. Further, here, the measurement was performed at 0 [sec] and at 40 [sec].

From these measurement results, it can be seen that the T sheet 54 has substantially the same hydrophilicity as the print sheet PS, but has a significantly lower lipophilicity than the print sheet PS. Further, it can also be seen that the T sheet 54 is significantly reduced in both hydrophilicity and lipophilicity as compared to the OHP sheet OS.

The special medium 55 (FIGS. 2A-2C) is, for example, a fabric such as a T-shirt, and generally, as compared to a sheet of paper on which an image is printed, is thicker, has a rougher surface, and is significantly less rigid. Therefore, it is extremely difficult to carry the special medium 55 along the carrying path W in the image forming apparatus 1, and it is virtually impossible to directly transfer a developer image thereto using the image forming apparatus 1.

1-4-3. Print Process

Next, detailed procedures of a print process in the special medium printing system 50 are described again with reference to FIGS. 2A-2C. In the special medium printing system 50, an image forming process in which an image is formed is broadly divided into performing a first transfer process in which first transfer processing is performed, and a second transfer process in which second transfer processing is performed.

First, in the special medium printing system 50, as the image forming process, as illustrated in FIG. 2A, a developer image 57 is formed by the image forming apparatus 1, and a process, that is, a print process, in which the developer image 57 is transferred to the M sheet 53 as the sheet P, is performed. In this case, the image forming apparatus 1 performs a series of print processes in a state in which the M sheet 53 in a posture in which the transfer surface (that is, the surface on which the adhesive layer 72 is laminated) is facing upward is placed on the sheet feeding tray 21.

As a result, the developer image 57 is transferred to the developer transfer surface 72A (FIGS. 3A and 3B) of the adhesive layer 72 of the M sheet 53, and the developer image 57 is bound to the adhesive layer 72. In other words, in the M sheet 53, the developer image 57 layer overlaps with the adhesive layer 72 on the transfer surface side. In the image forming process (FIG. 2A), a color developer layer 57C of the developer image 57 is formed on the adhesive layer 72 of the M sheet 53, and a photoluminescent developer layer 57S overlaps on an upper side of the color developer layer 57C.

Subsequently, in the special medium printing system 50, as illustrated in FIG. 2B, as the first transfer process, a process in which the developer image 57 is transferred from the M sheet 53 to the T sheet 54 is performed by the iron press device 51. Specifically, in the iron press device 51, the T sheet 54 is placed on the upper surface 62S of the iron lower part 62, and the M sheet 53 in a posture in which the transfer surface (that is, the surface onto which the developer image 57 has been transferred) faces downward and the developer image 57 opposes the surface 54A of the T sheet 54 overlaps on an upper side of the T sheet 54.

In this state, the iron press device 51 starts an iron press process in which the iron upper part 61 in a state of being heated to a predetermined temperature is pressed against the iron lower part 62, and, after a predetermined time period has elapsed, the iron upper part 61 is pulled away from the iron lower part 62, and the iron press process is completed. As a result, the developer image 57 is bound with a relatively strong force to the surface of the T sheet 54.

After that, in the iron press device 51, in the iron lower part 62, the M sheet 53 placed on the uppermost side is peeled off from the T sheet 54. Here, the developer image 57 is bound to the surface 54A of the T sheet 54 on the lower side, and is bound to the developer transfer surface 72A of the adhesive layer 72 on the upper side. Further, a force with which a lower surface of the developer image 57 binds to the surface 54A of the T sheet 54, and a force with which an upper surface of the developer image 57 binds to the developer transfer surface 72A of the adhesive layer 72 are greater than a force with which the contact surface 72B of the adhesive layer 72 binds to the mount 71.

Therefore, the M sheet 53 is peeled off while the developer image 57 and the adhesive layer 72 remain on the T sheet 54 side in a region where the developer image 57 is transferred. As a result, the developer image 57 and the adhesive layer 72 are transferred to the surface 54A of the T sheet 54.

In the first transfer process (FIG. 2B), the surface 54A of the T sheet 54 is heated and pressed with the photoluminescent developer layer 57S of the developer image 57 in contact with the surface 54A. Further, in the first transfer process, after the M sheet 53 is peeled off, the photoluminescent developer layer 57S and the color developer layer 57C of the developer image 57 are sequentially laminated on the surface 54A of the T sheet 54, and the adhesive layer 72 is further laminated.

Subsequently, in the special medium printing system 50, as illustrated in FIG. 2C, as the second transfer process, a process is performed using the iron press device 51, in which the developer image 57 is transferred from the T sheet 54 to the special medium 55. Specifically, in the iron press device 51, the special medium 55 is placed on the upper surface 62S of the iron lower part 62, and, on an upper side of the special medium 55, the T sheet 54 overlaps in a posture in which the surface 54A side, that is, the surface onto which the developer image 57 and the adhesive layer 72 have been transferred faces downward and the developer image 57 and the adhesive layer 72 face the special medium 55.

In this state, in the iron press device 51, the iron upper part 61 in a state of having been heated to a predetermined temperature is pressed against the iron lower part 62, and, after a predetermined time has elapsed, the iron upper part 61 is pulled away from the iron lower part 62. As a result, the contact surface 72B on a lower side of the adhesive layer 72 binds to the surface of the special medium 55 with a relatively strong force. Further, the developer transfer surface 72A on an upper side of the adhesive layer 72 remains to be bound to the developer image 57 with a relatively strong force.

After that, in the iron press device 51, in the iron lower part 62, the T sheet 54 placed on the uppermost side is peeled off from the special medium 55. Here, a force with which the contact surface 72B of the adhesive layer 72 binds to the special medium 55, and a force with which the developer transfer surface 72A of the adhesive layer 72 binds to the developer image 57 are greater than a force with which the developer image 57 binds to the surface 54A of the T sheet 54.

Therefore, the T sheet 54 is peeled off with the developer image 57 and the adhesive layer 72 remaining on the special medium 55 side. That is, the adhesive layer 72 and developer image 57 have been transferred to the surface of the special medium 55.

In the second transfer process (FIG. 2C), the adhesive layer 72 is in contact with the special medium 55, and the color developer layer 57C and the photoluminescent developer layer 57S of the developer image 57 are laminated sequentially from a lower side, and the T sheet 54 overlaps on an upper side thereof, and in this state, heat and pressure are applied thereto. Subsequently, in the second transfer process, after the T sheet 54 is peeled off, the adhesive layer 72, the color developer layer 57C and the photoluminescent developer layer 57S of the developer image 57 are sequentially laminated on the surface of the special medium 55, and the print process is completed.

In this way, in the special medium printing system 50, by performing the formation process of the developer image 57 and the two transfer processes using the M sheet 53 and the T sheet 54, the developer image 57 can be finally transferred and bound to the special medium 55, that is, an image can be printed on the special medium 55.

1-5. Measurement of Developer

Next, a measurement of a developer is described. Regarding a measurement of a developer, measurements of a developer particle size (volume median diameter (Dv50)) and a phase angle were performed.

1-5-1. Measurement of Volume Median Diameter

In this measurement, a volume median diameter of a photoluminescent pigment was measured using a precision particle size distribution measuring device Multisizer3 (manufactured by Beckman Coulter, Co., Ltd.). Measurement conditions are as follows.

Aperture diameter: 100 [μm]

Electrolyte solution: Isoton II (manufactured by Beckman Coulter Co., Ltd.)

Dispersion liquid: Neogen S-20F (manufactured by Daiichi Kogyo Seiyaku Co., Ltd.) is dissolved in the above electrolyte solution and a concentration thereof is adjusted to 5[%].

In this measurement, 10-20 [mg] of a measurement sample was added to 5 [mL] of the above-described dispersion liquid and dispersed using an ultrasonic disperser for 1 minute, and after that, 25 [mL] of the electrolytic solution was added and dispersed using an ultrasonic disperser for 5 minutes, and agglomerates were removed using a mesh having a mesh aperture size of 75 [μm] to prepare a sample dispersion liquid.

Further, in this measurement, the sample dispersion liquid was added to 100 [mL] of the above-described electrolyte solution, and 30,000 particles were measured using the above-described precision particle size distribution measuring device to determine a distribution (that is, a volume particle size distribution). Subsequently, in this measurement, a volume median diameter (Dv50) was determined based on the volume particle size distribution.

The term "volume median diameter (Dv50)" refers to a particle size when the number or mass of particles having particles sizes larger than a certain particle size occupies 50[%] of the total number or mass of the entire powder in a particle size distribution. The precision particle size distribution measuring device described above measures a particle size distribution based on a Coulter principle. The Coulter principle is called a pore electrical resistance method, and is a method in which a volume of particles is measured by applying a constant current to pores (apertures) in an electrolyte solution and measuring a change in electrical resistance of the pores when the particles pass through the pores.

1-5-2. Measurement of Phase Angle of Developer

In this measurement, a dynamic viscoelasticity of a developer was measured using a sine wave vibration method using a viscoelasticity measuring device Discovery HR-2 (manufactured by TA Instruments Japan Co., Ltd.), and a phase angle was determined from the measured dynamic viscoelasticity. Measurement conditions are as follows.

In this measurement, a developer was formed into a tablet, and then, was set on a parallel plate having a diameter of 25 [mm], and a sine wave vibration of a frequency of 1 [Hz] is applied thereto, and thereby, a dynamic viscoelasticity was measured. Subsequently, in this measurement, the measurement was started at 45[° C.] and was performed up to 125[° C.] at a heating rate of 1[° C.]/minute. Further, in this measurement, from the measurement results, a phase angle of each developer at 125[° C.] was determined.

(Measurement Condition)

Additional conditions of the measurement, discussed in the above paragraph, are described here. After molding the developer of 1.0 to 2.0 g into tablets, the tablets are sandwiched between a pedestal and a rotation disk. As raising the environmental temperature from 45 to 125[° C.] at a rate of 1[° C./min.], the torque, which is required to drive the disk rotating at one RPS (Revolution Per Second), is measured. A viscosity at each temperature is measured by converting the torque to a viscosity.

By this measurement, the measurement results as shown in the table illustrated in FIG. 9 were obtained as the phase angles of the developers. Here, a photoluminescent developer having a phase angle of 35[°] or less needs to contain an aluminum pigment in an amount of 20[%] or more in the developer and thus is difficult to be manufactured. On the other hand, a photoluminescent developer having a large phase angle has a small proportion of an aluminum pigment in the developer and thus has a weak metallic luster.

1-5-3. Calculation of Phase Angle Difference Between Developers

In this measurement, a phase angle difference, which is a difference between a phase angle of a color developer and a phase angle of a photoluminescent developer, was calculated from the measured phase angles of the developers. By this measurement, the measurement results as shown in the table illustrated in FIG. 10 were obtained as the phase angle differences of the developers.

1-6. Examination of Print Quality

Next, in the special medium printing system 50, print quality was examined. Specifically, observation was performed focusing on print processing finish and photoluminescence of an image printed on the special medium 55.

In the special medium printing system 50, in an initial image forming process (FIG. 2A), a carrying speed (that is, a print speed) of the M sheet 53 in the image forming apparatus 1 (FIG. 1) was set to 18 [mm/sec], and a fusing temperature of the fuser 70 was set to 160[° C.]. Further, in the image forming apparatus 1, by performing a predetermined operation in which print conditions were set, a print process was performed in a state in which an amount of the photoluminescent developer TS adhered to the photosensitive drum 14 of the image forming unit 10S was adjusted to 1.0 [mg/cm2]. Further, in the image forming apparatus 1, an optical density (OD) value in a case where a print image density indicating a toner concentration was set to 100[%] was measured using an X-Rite 526 (manufactured by X-Rite Corporation) and a color developer was adjusted to 1.40-1.50, and a print process was performed.

Here, the print image density is a value representing a ratio of the number of pixels that transfer a developer to the sheet P to the total number of pixels when an image is decomposed in pixel units. For example, printing of an area ratio of 100[%] when solid printing is performed in an entire printable range of a predetermined area (such as an area corresponding to one cycle of the photosensitive drum 14 or one page worth of a print medium) is referred to as a print image density of 100[%], and printing corresponding to an area of 1[%] with respect to the print image density of 100[%] is referred to as a print image density of 1[%]. When a print image density DPD is expressed by a mathematical formula using the number of dots used Cm, the number of rotations Cd, and the total number of dots CO, the print image density DPD can be expressed as the following Eq. (1).

[Mathematical Formula 1]

$$DPD = \frac{Cm}{Cd \times CO} \times 100[\%] \tag{1}$$

Here, the number of dots used Cm is the number of dots actually used to form an image during Cd rotations of the photosensitive drum 14, and is the total number of dots exposed by the print head 13 (FIG. 1) during the formation of the image. Further, the total number of dots CO is the total number of dots per rotation of the photosensitive drum 14 (FIG. 1), that is, the total number of dots that are potentially usable in forming an image and can be used during one rotation of the photosensitive drum 14 regardless of presence or absence of exposure. In other words, the total number of dots CO is the total number of dots used when forming a solid image in which a developer is transferred to all pixels. Therefore, the value (Cd×CO) represents the total number of dots that are potentially usable in forming an image during Cd rotations of the photosensitive drum 14.

Further, in the special medium printing system 50, in the next first transfer process (FIG. 2B), the temperature of the heat generation surface 63S in the iron press device 51 was set to 180[° C.], the time of the iron press process was set to 45 seconds, and the pressure was set to 31.4 [kPa]. Further, in the first transfer process, the M sheet 53 was peeled off from the T sheet 54 within 5 seconds after the iron press process was completed.

Further, in the special medium printing system 50, in the next second transfer process (FIG. 2C), the temperature of the heat generation surface 63S in the iron press device 51 was set to 125-135[° C.], the time of the iron press process was set to 5 seconds, and the pressure was set to 31.4 [kPa]. Further, in the second transfer process, as the special medium 55, a black T-shirt of 100[%] cotton was used. Further, in the second transfer process, the T sheet 54 was peeled off from the special medium 55 after radiational cooling for 60 seconds after the iron press process was completed.

1-6-1. Evaluation of Finish

In this evaluation, the print processing finish of an image printed on the special medium 55 was evaluated in three stages by comprehensively judging from smoothness of an image surface, transferability of a developer, and the like, and the obtained evaluation results are shown in FIG. 10. As the evaluation results, a symbol "○" is used to indicate a good finish, a symbol "x" is used to indicate a poor finish, and a symbol "Δ" is used to indicate a quality between "○" and "X." Symbol "○" may indicate "Excellent" and Symbol "○" may indicate "Good" or "Fair."

1-6-2. Evaluation of Photoluminescence

In this evaluation, the photoluminescence of an image printed on the special medium 55 was visually judged, and the evaluation results are shown in FIG. 10. Here, since a fabric medium such as a T-shirt bends, it is difficult to stably measure the photoluminescence of an image printed on the special medium 55 using a measuring instrument such as a variable angle photometer. Therefore, the evaluation of the photoluminescence of a metallic color, which is this evaluation, was visually performed. As the evaluation results, a symbol "○" is used to indicate a good photoluminescence, and a symbol "Δ" is used to indicate a photoluminescence that is slightly inferior to a good photoluminescence.

1-6-3. Overall Evaluation

In this evaluation, a result of an overall judgment based on both the evaluation of the print processing finish of an image printed on the special medium 55 and the evaluation of the photoluminescence of the image was taken as an overall evaluation result, and the obtained evaluation results are shown in FIG. 10. As the evaluation results, a symbol "○" is used to indicate a good overall evaluation result, a symbol "X" is used to indicate a poor overall evaluation result, and a symbol "Δ" is used to indicate a quality between "○" and "x".

1-7. Determination of Phase Angle Based on Measurement and Evaluation

Figure 11:
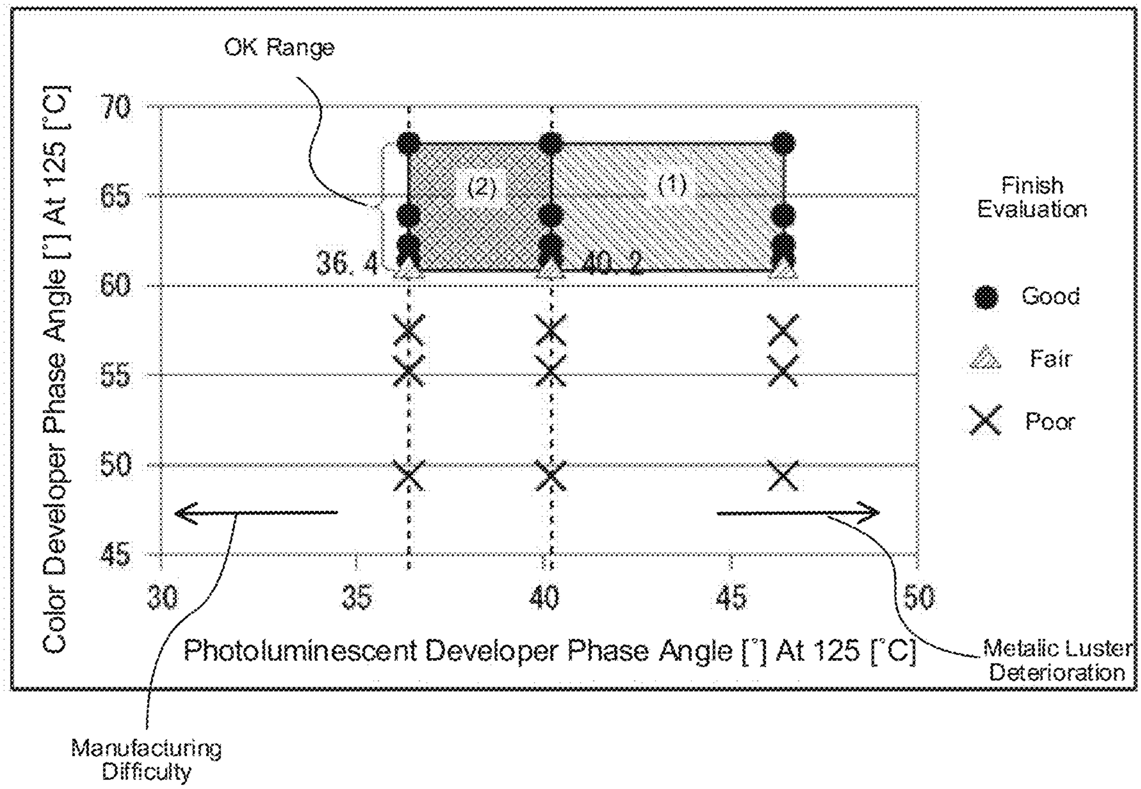
FIG. 11 is a graph showing a relationship between a photoluminescent developer phase angle and color developer phase angle.
Figure 12:
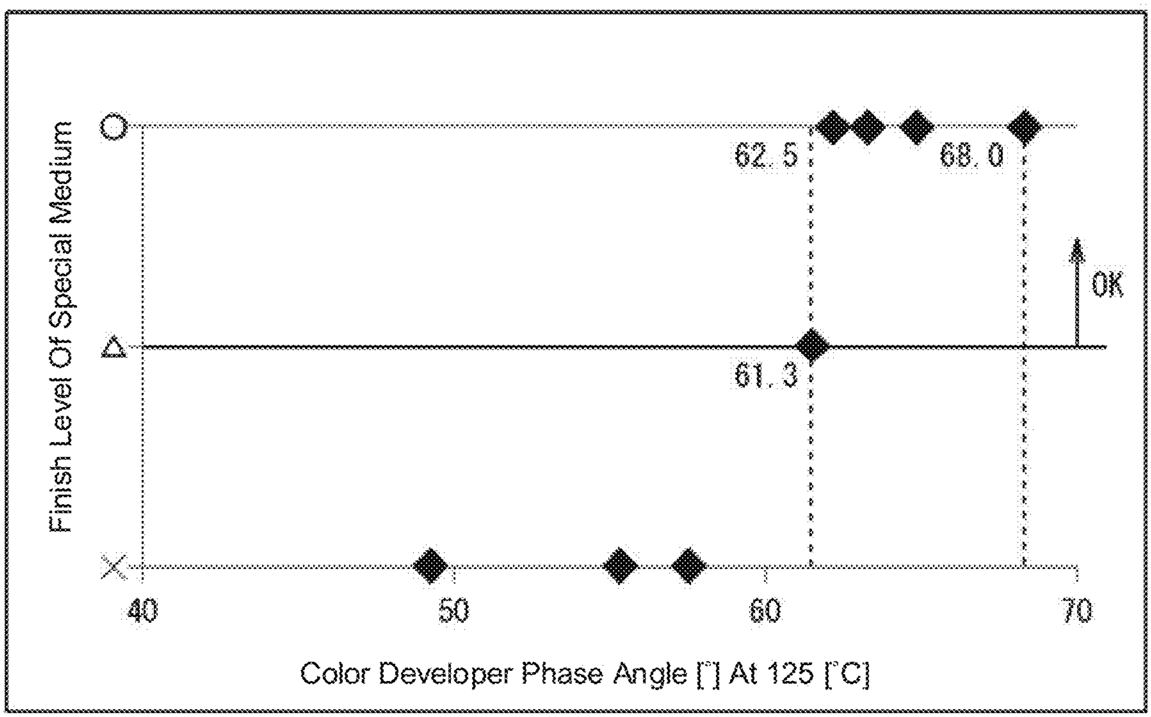
FIG. 12 is a graph showing a relationship between a photoluminescent developer phase angle and a finish level.

Next, based on various measurement results and various evaluation results (FIG. 10), a phase angle condition of a photoluminescent developer and a phase angle condition of a color developer were determined. Further, FIG. 11 shows a relationship between a photoluminescent developer phase angle and a color developer phase angle obtained by the above-described evaluations. Further, FIG. 12 shows a relationship between a color developer phase angle and the print processing finish of an image printed on the special medium 55 obtained by the above-described evaluations.

Specifically, in the present embodiment, excluding a combination of a color developer and a photoluminescent developer for which the overall evaluations were poor ("x"), a combination of a color developer and a photoluminescent developer for which the overall evaluations were medium ("Δ") was adopted, and, more preferably, a combination of a color developer and a photoluminescent developer for which the overall evaluations were high ("○") was adopted. A medium overall evaluation ("Δ") is in a region indicated by hatching (1) in FIG. 11. A high overall evaluation ("○") is in a region indicated by hatching (2) in FIG. 11. These hatching regions are combined and termed as "○K Range" of the overall evaluation.

1-8. Effects and the Like

Here, a phase is regarded as a ratio of viscosity to elasticity. A phase angle of 0[°] means that it is a 100[%] elastic material, and a phase angle of 90[°] means that it is a 100[%] viscous material. Further, a phase angle of 45[°] means a point where the viscosity and the elasticity match each other. When a phase angle is 45 [ ] or less, an elastic component is large and the material becomes elastic and becomes more solid. On the other hand, when a phase angle is 45[°] or more, a viscous component is large and the material becomes viscous, and becomes more fluid.

When a behavior of an elastic material is large (that is, a phase angle is smaller than 45[°]), the material exhibits a behavior of easily returning to its original state instantly when a force is removed. On the other hand, when a behavior of a viscous material is large (that is, a phase angle is larger than 45[°]), the material exhibits a behavior of being difficult to return to its original state even when a force is removed.

The photoluminescent developers TSa, TSb and TSc each contain aluminum as a photoluminescent pigment in an amount of 10-20[%], and a phase angle becomes smaller as the amount of the photoluminescent pigment as a solid content increases. Although the photoluminescent developer TSc has a phase angle of 45[°] or more and becomes viscous, since the amount of the photoluminescent pigment contained therein is small, the photoluminescence of the image is also inferior.

On the other hand, all the color developers each have a phase angle of 45[°] or more, and are highly viscous. However, for the magenta developer TM2, the cyan developer TC2, and the black developer TK2 which each had a small phase angle among the color developers, a surface of an image printed on the special medium 55 was rough and scaly, and the finish was poor. It is thought that since a photoluminescent developer with an elastic tendency and a color developer are superimposed, when the color developer has a low viscosity, it is difficult for the color developer to bind to the photoluminescent developer, and, since it is weaker than a binding force with respect to the M sheet 53 or the T sheet 54, the image surface becomes rough.

Figure 13A:
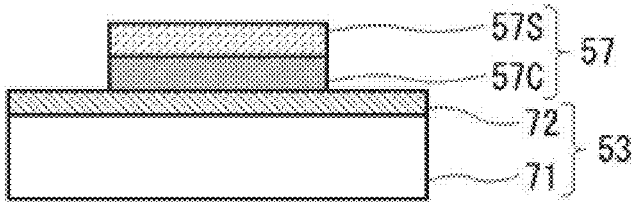
FIGS. 13A-13C illustrate how a scale-like pattern occurs.

That is, since a large amount of a flat metal pigment (aluminum) is added to a photoluminescent developer in order to generate a metallic luster, characteristics of the photoluminescent developer can include the following two points. First, as illustrated in FIG. 14, it is thought that the surface of the photoluminescent developer layer 57S at the interface between the color developer layer 57C and the photoluminescent developer layer 57S is uneven rather than completely smooth. Second, the photoluminescent developer has a small phase angle, and thus, exhibits a behavior of easily returning to its original state instantly. That is, the color developer layer 57C is formed on the photoluminescent developer layer 57S in an uneven state, and, in this state, as illustrated in FIGS. 13A-13C, the M sheet 53 is peeled off from the T sheet 54.

Figure 13B:
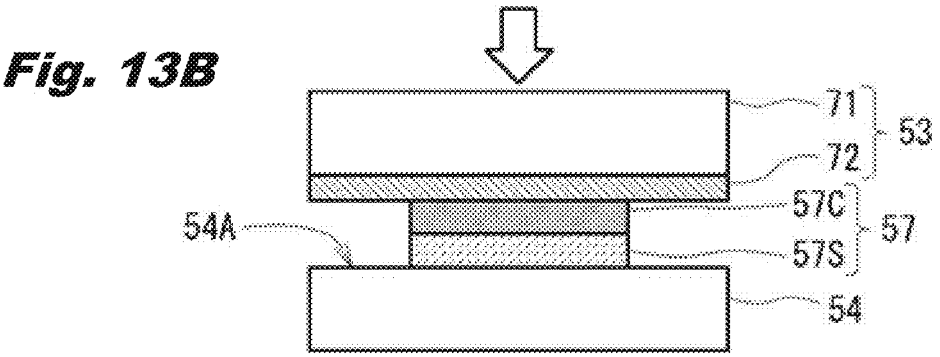
Figure 13C:
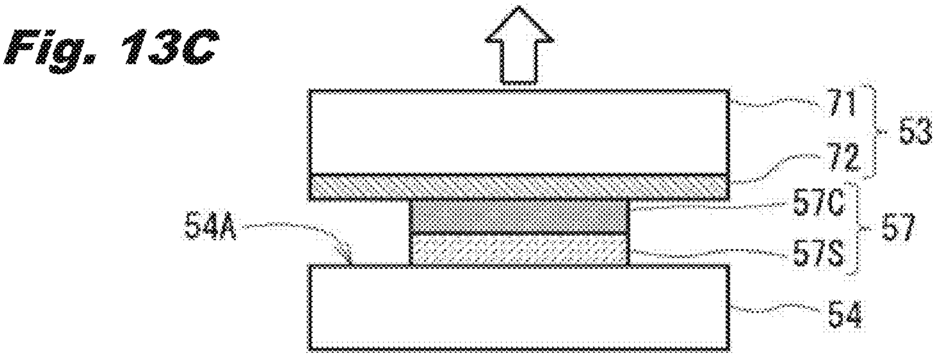
Figure 14:
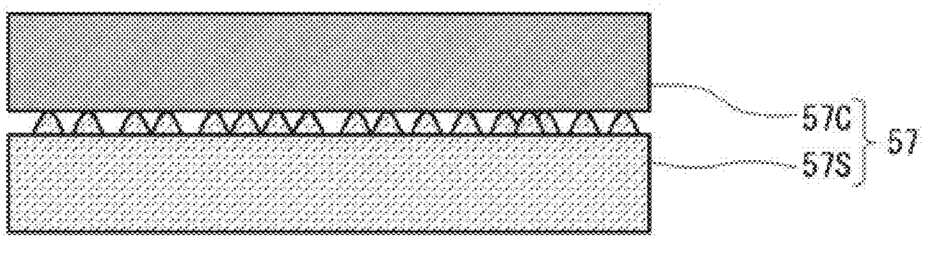
FIG. 14 illustrates a state of an interface of a photoluminescent developer.

Therefore, as illustrated in FIG. 13B, when an iron press process is performed, the color developer layer 57C enters gaps of the photoluminescent developer layer 57S in an uneven state, and, after that, during a time period until the M sheet 53 is peeled off from the T sheet 54, when the color developer layer 57C returns to its original state, as illustrated in FIG. 13C, when the M sheet 53 is peeled off from the T sheet 54, there is a possibility that a scale-like pattern may occur in the developer image 57. In this way, when the developer image 57 in which a scale-like pattern has occurred is transferred to the special medium 55, a scale-like pattern occurs in the transferred developer image 57, and thus, the print quality deteriorates. It is thought that this occurs regardless of the lamination order of the developer layers.

Therefore, when the color developer layer 57C enters gaps of the photoluminescent developer layer 57S in an uneven state during the iron press process, during a time period until the M sheet 53 is peeled off from the T sheet 54, it is necessary that it is hard for the color developer layer 57C to return to its original state.

On the other hand, the image forming apparatus 1 of the special medium printing system 50 according to the present embodiment includes: the image forming process as an image forming step in which the developer image 57 is formed and the developer image 57 is transferred to the developer transfer surface 72A of the M sheet 53 on which the adhesive layer 72 is formed; the first transfer process as a first transfer step in which, in a state in which the T sheet 54 as an intermediate transfer medium is placed on the developer transfer surface 72A side of the M sheet 53 onto which the developer image 57 has been transferred, by applying heat and pressure using the iron press device 51 as a heating and pressing device, the developer image 57 and the adhesive layer 72 are transferred to the T sheet 54; and the second transfer process as a second transfer step in which, in a state in which the surface of the T sheet 54 onto which the developer image 57 and the adhesive layer 72 have been transferred faces the 55 special medium, by applying heat and pressure using the iron press device 51, the developer image 57 and the adhesive layer 72 are transferred to the special medium 55.

Further, the image forming process includes: a developer image forming step in which the photoluminescent developer layer 57S as a first image is formed on the M sheet 53 using the silver developer as a photoluminescent developer containing a photoluminescent pigment, and the color developer layer 57C as a second image is formed on the M sheet 53 using the color developer as a coloring developer containing a coloring material; and a developer image transfer step in which at least one of the photoluminescent developer layer 57S and the color developer layer 57C is transferred onto the M sheet 53 by the secondary transfer part 44 as a transfer part, and the color developer phase angle A as a viscoelastic phase angle of the color developer and the photoluminescent developer phase angle B as a viscoelastic phase angle of the photoluminescent developer when measured at 125[° C.] using a viscoelasticity measuring device satisfy A−B=21.1-31.6[°].

In this way, in the special medium printing system 50, the difference between the color developer phase angle and the photoluminescent developer phase angle is increased to 21.1-31.6[°]. Therefore, in the special medium printing system 50, the color developer layer 57C can be easily held in the gaps at the interface of the photoluminescent developer layer 57S, which is uneven, during the iron press process. As a result, in the special medium printing system 50, a scaly pattern can be prevented from occurring in the developer image 57 when the M sheet 53 is peeled off from the T sheet 54. Thus, in the special medium printing system 50, a scaly pattern can be prevented from occurring in the developer image 57 transferred from the T sheet 54 to the special medium 55, and the print quality can be improved.

Further, in the special medium printing system 50, the color developer phase angle is set to 61.3[°] or more. Therefore, in the special medium printing system 50, as illustrated in FIG. 12, the print processing finish of the image printed on the special medium 55 can be improved.

Further, in the special medium printing system 50, the photoluminescent developer phase angle is set to less than 46.5[°]. Therefore, in the special medium printing system 50, as shown in FIG. 11, print processing photoluminescence of the image printed on the special medium 55 can be improved.

Further, in a case where a photoluminescent developer and a color developer are superimposed to express a metallic color on the special medium 55, when the developer set has a photoluminescent phase angle of 36.4-40.2[°] and a color developer phase angle of 61.3-68.0[°], the print quality is good. In this case, the difference between the photoluminescent developer phase angle and the color developer phase angle is preferably 21.1-31.6[°].

According to the above configuration, in the special medium printing system 50 according to the present embodiment, the image forming unit 10S that forms the photoluminescent developer layer 57S on the M sheet 53 as a print medium using a photoluminescent developer containing a photoluminescent pigment, the image forming units 10K, 10C, 10M and 10Y that form the color developer layer 57C on the M sheet 53 using color developers containing coloring materials, the image forming unit 10 that laminates the photoluminescent developer layer 57S and the color developer layer 57C on the M sheet 53, the secondary transfer part 44 and the control part 3 are provided, and the viscoelastic phase angle A of the color developer and the viscoelastic phase angle B of the photoluminescent developer when measured at 125[° C.] using a viscoelasticity measuring device satisfy A−B=21.1-31.6[°].

As a result, in the special medium printing system 50, in the iron press process of the first transfer process, the color developer layer 57C can be easily held in gaps at the interface of the photoluminescent developer layer 57S which is uneven, and, when the M sheet 53 is peeled off from the T sheet 54, the developer image 57 and the adhesive layer 72 can be satisfactorily transferred to the T sheet 54 without causing a scale-like pattern to occur in the developer image 57, and further, in the second transfer process, the image can be transferred to the special medium 55, that is, a high quality image can be printed on the special medium 55.

2. Second Embodiment

2-1. Configuration of Special Medium Printing System

As illustrated in FIGS. 2A-2C, a special medium printing system 150 according to second embodiment differs from the special medium printing system 50 according to the first embodiment in that an image forming apparatus 101 is provided instead of the image forming apparatus 1, but is configured in the same way regarding the other parts.

2-2. Configuration of Image Forming Apparatus

Figure 15:
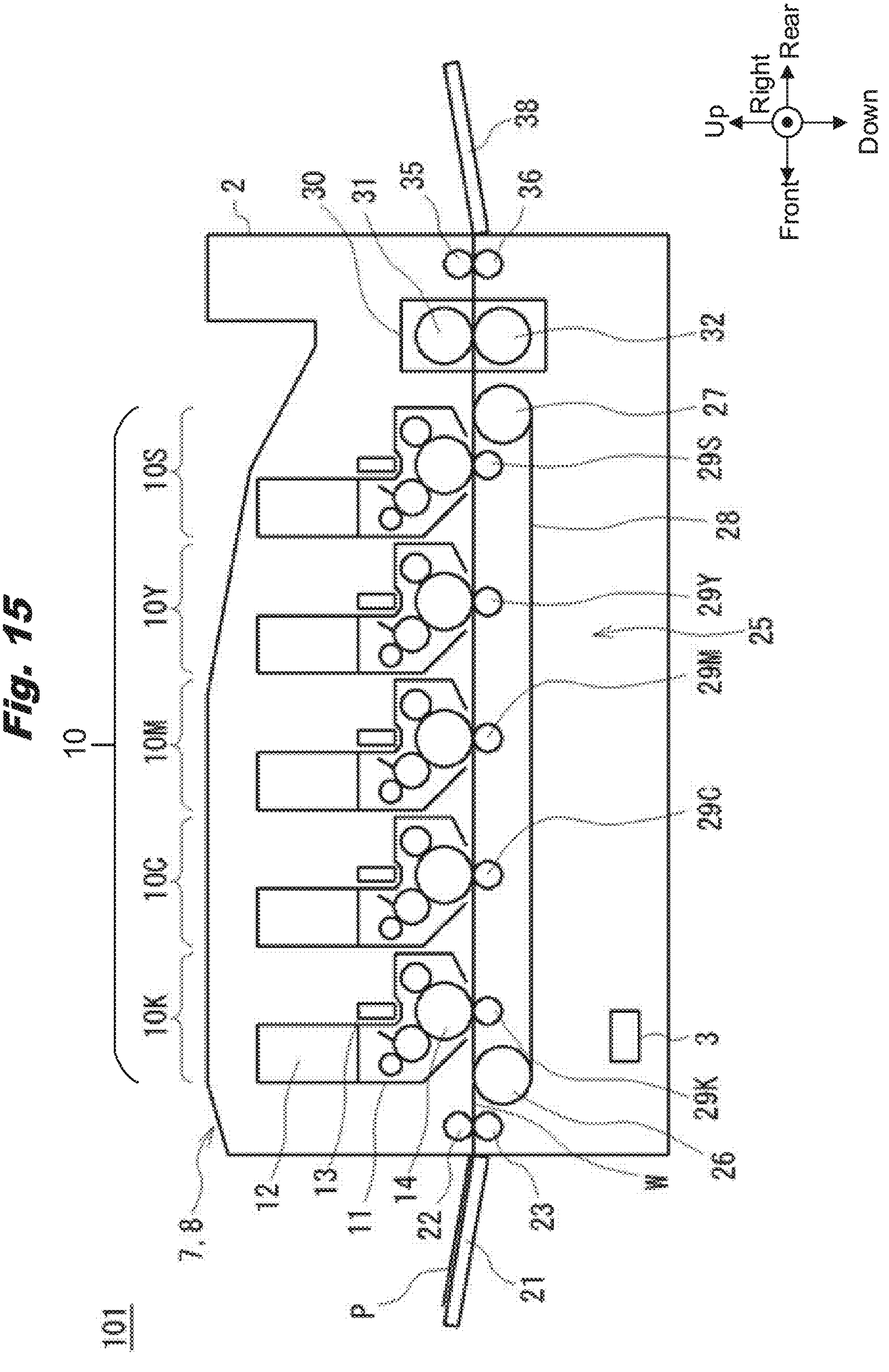
FIG. 15 is a right side view illustrating a configuration of an image forming apparatus according to a second embodiment.

As illustrated in FIG. 15 in which the members corresponding to those of FIG. 1 are indicated using the same reference numeral symbols, the image forming apparatus 101 according to the second embodiment adopts a transfer method different from that of the image forming apparatus 1 of the first embodiment (FIG. 1). The image forming apparatus 1 adopts a so-called intermediate transfer method (or secondary transfer method), that is, the developer images of the respective colors are transferred from the photosensitive drums 14 of the image forming units 10 so as to be sequentially superimposed on the intermediate transfer belt 40, and the developer images are transferred from the intermediate transfer belt 40 to the sheet P. On the other hand, the image forming apparatus 101 adopts a so-called direct transfer method, that is, the developer images are directly transferred from the photosensitive drums 14 of the image forming units 10 to the sheet P.

For example, when a transfer belt 28 is used to form an image, as will be described later, the control part 3 laminates the first image and the second image on the M sheet 53 carried by the transfer belt 28. The image forming units 10 (10S, 10K, 10C, 10M and 10Y), the transfer rollers 29 (29*s*, 29K, 29C, 29M and 29Y) and the control part 3 form a "lamination part" of an embodiment of the application.

As compared to the image forming apparatus 1 according to the first embodiment, the image forming apparatus 101 according to the second embodiment has a transfer carrying part 25 in place of the intermediate transfer part 37.

The transfer carrying part 25 is arranged on a rear side of the registration rollers 22 and 23 and on a lower side of the carrying path W, that is, on a lower side of the five image forming units 10. The transfer carrying part 25 includes the front carrying roller 26, the rear carrying roller 27, the transfer belt 28, and the five transfer rollers 29 (29K, 29C, 29M, 29Y and 29S). For convenience of description, in the following, the transfer roller 29K, 29C, 29M, 29Y and 29S are also collectively referred to as the transfer rollers 29.

The front carrying roller 26 has a columnar shape with a central axis along the left-right direction, and is arranged on a lower front side of the image forming unit 10K at a position where a vicinity of an upper end of the front carrying roller 26 is in contact with or extremely close to the carrying path W. Similar to the front carrying roller 26, the rear carrying roller 27 has a columnar shape with a central axis along the left-right direction. The rear carrying roller 27 is arranged on a rear side and a lower side of the image forming unit 10S, and a vicinity of an upper end of the rear carrying roller 27 is in contact with or extremely close to the carrying path W.

The transfer belt 28 is an endless belt formed of a flexible material and has a sufficient width in the left-right direction. The transfer belt 28 is stretched so as to move around the front carrying roller 26 and the rear carrying roller 27. Therefore, an upper part of the transfer belt 28 stretched between the front carrying roller 26 and the rear carrying roller 27 moves along the carrying path W and is in contact with vicinities of lower ends of the photosensitive drums 14 of the image forming units 10.

The transfer rollers 29 (29K, 29C, 29M, 29Y and 29S) are each formed in a columnar shape with a central axis along the left-right direction similar to the front carrying roller 26 and the like. The transfer rollers 29K, 29C, 29M, 29Y and 29S are respectively arranged at positions directly below the image forming units 10K, 10C, 10M, 10Y and 10S between the front carrying roller 26 and the rear carrying roller 27. Further, each of the transfer rollers 29 is biased upward, and a vicinity of an upper end thereof is in contact with the transfer belt 28. In other words, the transfer belt 28 is sandwiched between the transfer rollers 29 and the photosensitive drums 14 of the image forming units 10 on the carrying path W. Further, similar to the rollers of the image forming units 10, a predetermined high voltage is applied to each of the transfer rollers 29.

In the transfer carrying part 25, by appropriately rotating the front carrying roller 26, the rear carrying roller 27 and the transfer rollers 29, the transfer belt 28 moves around the front carrying roller 26 and the rear carrying roller 27, and moves in a rearward direction (hereinafter, this is also referred to as a carrying direction) in the carrying path W. In this case, in the transfer carrying part 25, when a sheet P is supplied thereto by the registration rollers 22 and 23 on the front side, the sheet P is sandwiched between the photosensitive drums 14 of the image forming units 10 and the transfer rollers 29 together with the transfer belt 28, and is carried in the rearward direction along the carrying path W. Further, in each of the image forming units 10, when a developer image has been formed, the developer image is transferred from the outer peripheral surface of the photosensitive drum 14 to an upper surface (that is, a print surface) of the sheet P.

In the image forming apparatus 101, the sheet P is advanced in the rearward direction along the carrying path W, and the developer images of the respective colors (that is, the black developer image, the cyan developer image, the magenta developer image, the yellow developer image and the photoluminescent developer image) are sequentially transferred from the image forming units 10K, 10C, 10M, 10Y and 10S to the sheet P. Therefore, when the developer images are transferred by the image forming units 10 to the same position on the sheet P, the black (K), cyan (C), magenta (M), yellow (Y) and silver (S) developers are sequentially superimposed on the surface of the print surface of the sheet P. For convenience of description, in the following, the black developer image, the cyan developer image, the magenta developer image, and the yellow developer image are collectively referred to as a color developer image. The fuser 30 is arranged on a rear side of the image forming unit 10S and the transfer carrying part 25.

In this way, in the image forming apparatus 101, the developer images using the developers are formed in the image forming units 10, the developer images are transferred to the sheet P carried by the transfer belt 28 in the transfer carrying part 25, and further, by fusing the developer images in the fuser 30, an image is printed (that is, an image is formed) on the sheet P.

In the special medium printing system 150 according to the second embodiment, similar to the special medium printing system 50 according to the first embodiment, the image forming unit 10S that forms the photoluminescent developer layer 57S on the M sheet 53 using a photoluminescent developer containing a photoluminescent pigment, and the image forming units 10K, 10C, 10M and 10Y that form the color developer layer 57C on the M sheet 53 using a color developer containing a coloring material are provided, and the viscoelastic phase angle A of the color developer and the viscoelastic phase angle B of the photoluminescent developer when measured at 125[° C.] using a viscoelasticity measuring device satisfy A−B=21.1-31.6 [°].

3. Other Embodiments

In the above-described embodiments, the case is described in which, in the image forming process (FIG. 2A), in the state in which the photoluminescent developer layer 57S is placed on the upper side of the color developer layer 57C, the developer image 57 is transferred to the M sheet 53 by the image forming apparatus 1. The application is not limited to this. For example, it is also possible that the developer image 57 is transferred to the M sheet 53 in a state in which the photoluminescent developer layer 57S is placed on the lower side of the color developer layer 57C. That is, it is also possible that the developer image 57 is transferred to the special medium 55 in a state in which the photoluminescent developer layer 57S is placed on the lower side of the color developer layer 57C.

Further, in the above-described embodiments, the case is described in which the silver developer is prepared by adding aluminum as a photoluminescent pigment during manufacture. The application is not limited to this. It is also possible that a golden developer is prepared by adding a yellow pigment (here, C.I. Pigment Yellow 180 as an organic pigment), a magenta pigment (here, C.I. Pigment Red 122 as an organic pigment), a red-orange fluorescent pigment (FM-34N_Orange, (manufactured by Shinroihi Co., Ltd.)), and a yellow fluorescent pigment (FM-35N_Yellow, (manufactured by Shinroihi Co., Ltd.)) in combination with a photoluminescent pigment during manufacture.

Further, in the above-described embodiments, the case is described in which the peeling surface 71A is formed by coating the surface of the mount 71 with a release agent (FIG. 3A). The application is not limited to this. For example, when the material forming the mount 71 has a property of allowing an adhesive medium (that is, the adhesive layer 72) to be easily peeled off, the peeling surface 71A may be formed without coating with a release agent.

Further, in the above-described embodiments, the case is described in which, in the adhesive layer 72 of the M sheet 53, the contact surface 72B has a larger surface roughness than the developer transfer surface 72A (FIGS. 4A and 4B). The application is not limited to this. For example, the developer transfer surface 72A and the contact surface 72B may have the same surface roughness. Further, the adhesive layer 72 is not limited to have a thickness of 40.0 [μm], but may have any other thickness. However, considering that it can be carried as the M sheet 53 inside the image forming apparatus 1 or 101, and that the developer image 57 is finally transferred and bound to the special medium 55 by the iron press device 51, the thickness is desirably 20-80 [μm], and the total thickness of the M sheet 53 is desirably 100-160 [μm]. Further, the adhesive layer 72 does not have to be lipophilic.

Figures 16A, 16B, 16C:
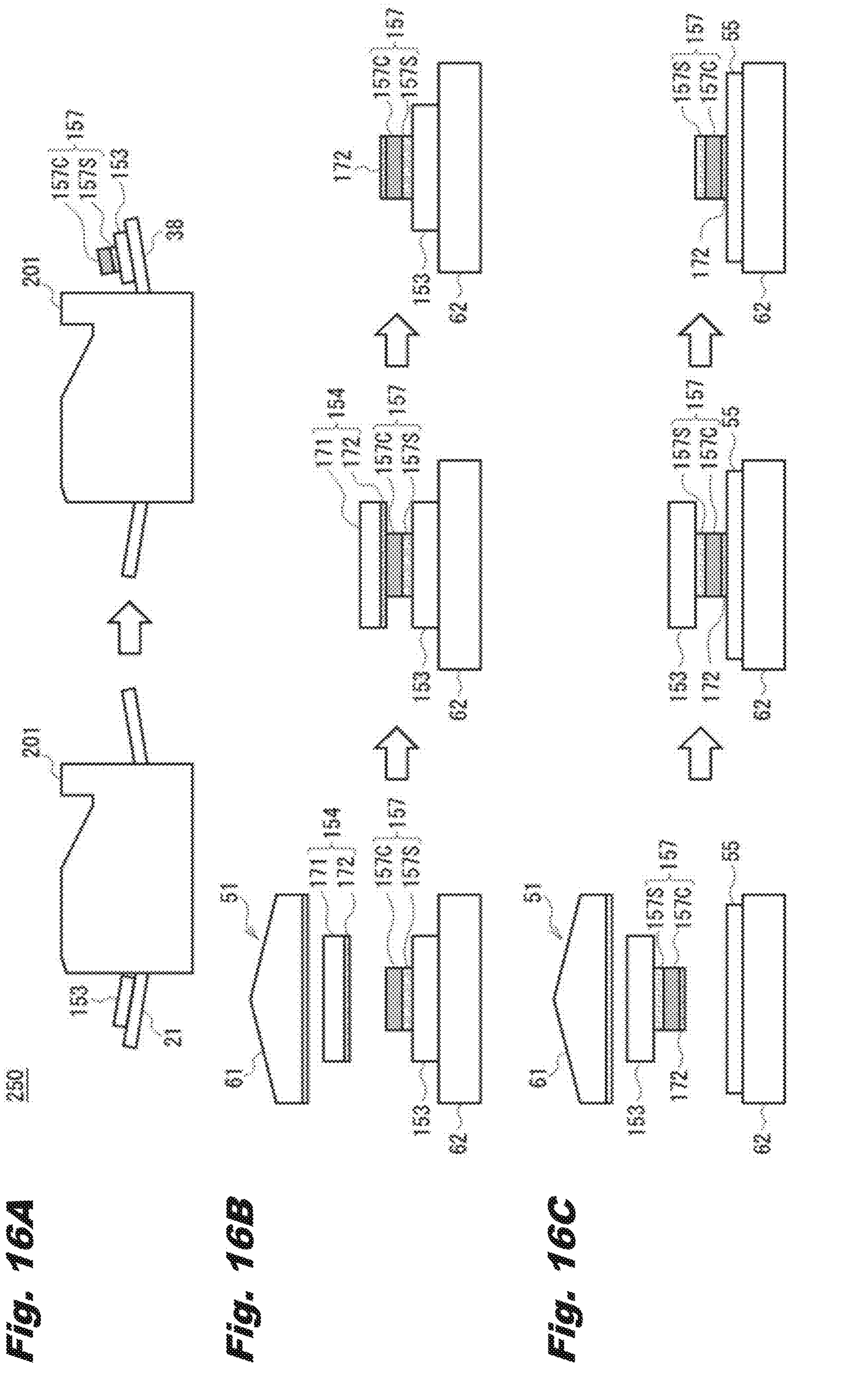
FIGS. 16A-16C illustrate printing of an image by a special medium printing system in other embodiments.

Further, in the above-described embodiments, the case is described in which the M sheet 53 (FIGS. 3A and 3B) formed by laminating the adhesive layer 72 on the mount 71 is used, and the developer image 57 is formed by the image forming apparatus 1 in the image forming process (FIG. 2A), and transferred to the M sheet 53. The application is not limited to this. For example, as in a special medium printing system 250 illustrated in FIG. 16 which corresponds to FIGS. 2A-2C, a transfer sheet 153 and a glue medium 154 may be used in place of the M sheet 53 and the T sheet 54.

The transfer sheet 153 is, for example, a transfer sheet TTC3.1 manufactured by The Magic Touch Corporation, and has a structure similar to that of the T sheet 54 described above. That is, the transfer sheet 153 does not have the adhesive layer 72. On the other hand, the glue medium 154 is, for example, a Laser-Dark B-Paper manufactured by Forever Corporation, and has a structure similar to that of the M sheet 53 described above, in which an adhesive layer 172 is laminated on a mount 171.

In the special medium printing system 250, an initial image forming process (FIG. 16A) is performed by an image forming apparatus 201 in place of the image forming apparatus 1, and after that, a first transfer process (FIG. 16B) and a second transfer process (FIG. 16C) are sequentially performed by the iron press device 51.

In the image forming apparatus 201, different from the image forming apparatus 1, the image forming unit 10S that forms a silver developer image is arranged on the most upstream side. Therefore, in the special medium printing system 250, in the image forming process (FIG. 16A), when the developer image 157 is formed on the transfer sheet 153 by the image forming apparatus 201, a photoluminescent developer layer 157S is formed directly on the transfer sheet 153, and a color developer layer 157C is superimposed on an upper side of the photoluminescent developer layer 157S.

Subsequently, in the special medium printing system 250, in the first transfer process (FIG. 16B), in a state in which the glue medium 154 is placed on an upper side of the transfer sheet 153 and the adhesive layer 172 is in contact with the developer image 157, an iron press process is performed by the iron press device 51 in which heat and pressure are applied at a temperature of 180[° C.] and a pressured of 31.4 [kPa] for 45 seconds. After that, by peeling off the glue medium 154, the transfer sheet 153 is in a state in which the adhesive layer 172 is bound to the developer image 157.

Further, in the special medium printing system 250, in the second transfer process (FIG. 16C), in a state in which the transfer sheet 153 is flipped upside down and is placed on the special medium 55 and the adhesive layer 172 is in contact with the special medium 55, an iron press process is performed by the iron press device 51 in which heat and pressured are applied at a temperature of 125-135[° C.] and a pressure of 31.4 [kPa] for 5 seconds. After that, by peeling off the transfer sheet 53, the special medium 55 is in a state in which the developer image 157 is bound to the special medium 55 by the adhesive layer 172 and the photoluminescent developer layer 157S is superimposed on an upper side of the color developer layer 157C. In this way, in the special medium printing system 250, by using the transfer sheet 153 and the glue medium 154, an image having good gradation expression can be printed on the special medium 55.

Further, in the above-described first embodiment, the case is described in which an image is finally printed on the special medium 55 formed of a T-shirt (FIGS. 2A-2C). The application is not limited to this. For example, an image may be printed on a special medium formed of various materials such as a fabric bag or curtain to which the adhesive layer 72 heated and pressed by the iron press device 51 can be bound. Or, an image may be printed on a special medium formed of a large metal plate, a heat-resistant plastic, or the like to which a developer layer is not directly transferred by the image forming apparatus 1 but is transferred via a print medium and an intermediate transfer medium, for example, a special medium that is extremely difficult to be carried along the carrying path W in the image forming apparatus 1 and to which it is virtually impossible to directly transfer a developer image by the image forming apparatus 1. In particular, it is thought that a scale-like pattern occurs in the process in which the M sheet 53 is peeled off from the T sheet 54 after applying heat and pressure. Therefore, when an idea disclosed in this application is applied to such a special medium printing system 50, the effect disclosed in the application can be remarkably exhibited. The same also applies to the second embodiment.

Further, in the above-described embodiments, the case is described in which the application is applied a developer used in a one-component development method. The application is not limited to this. The application may also be applied to a developer of a two-component development method which is a method in which, by mixing a carrier and a toner and utilizing friction between the carrier and the toner, an appropriate amount of charge is imparted to the toner.

Further, in the above-described embodiments, the case is described in which five image forming units 10 are provided in the image forming apparatus 1 or 101 (FIG. 1 or FIG. 15). The application is not limited to this. It is also possible that 4 or less or 6 or more image forming units 10 are provided in the image forming apparatus 1 or 101.

Further, in the above-described embodiments, the case is described in which the application is applied to the image forming apparatus 1 or 101 which is a single-function printer. The application is not limited to this. For example, the application may also be applied to an image forming apparatus having various other functions such as a multi-function peripheral (MFP) having functions of a copying machine and a facsimile machine.

Further, in the above-described embodiments, the case is described in which the application is applied to the image forming apparatus 1 or 101. The application is not limited to this. For example, the application may also be applied to various electronic devices such as a copier that form an image on a medium such as a sheet P using a developer using an electrophotographic method.

Further, the application is not limited to the embodiments and the other embodiments described above. That is, an application scope of the application also covers embodiments obtained by arbitrarily combining some or all of the above-described embodiments and the above-described other embodiments, and embodiments obtained by extracting some of the above-described embodiments and other embodiments.

Further, in the above-described first embodiment, the case is described in which the image forming apparatus 1 as an image forming apparatus is configured by the image forming unit 10S as a first image forming part, the image forming units 10K, 10C, 10M and 10Y as a second image forming part, the image forming unit 10, the secondary transfer part 44, and the control part 3 as an image forming part and a lamination part. The application is not limited to this. An image forming apparatus may be configured by a first image forming part, a second image forming part, and an image forming part, which are formed of various other configurations.

Further, in the above-described second embodiment, the case is described in which the image forming apparatus 101 as an image forming apparatus is configured by the image forming unit 10S as a first image forming part, the image forming units 10K, 10C, 10M and 10Y as a second image forming part, the image forming unit 10, the transfer rollers 29, and the control part 3 as an image forming part and a lamination part. The application is not limited to this. An image forming apparatus may be configured by a first image forming part, a second image forming part, and an image forming part, which are formed of various other configurations.

With respect to the lamination part, it does not have to has a belt. Any part or any device that functions to laminate the first image and the second image is defined as the lamination part of the invention. For example, when the first image and the second image are laminated inside either the first image forming part or the second image forming part, the corresponding image forming part in which the lamination process occurs is regarded as the lamination part.

The application can be used when an image is printed on a special medium using an electrophotographic image forming apparatus.

What is claimed is:

1. An image forming apparatus, comprising:

a first image forming part that forms a first image on a print medium using a photoluminescent developer containing a photoluminescent pigment;

a second image forming part that forms a second image on the print medium using a coloring developer containing a coloring material; and a lamination part that laminates the first image and the second image on the print medium, wherein a viscoelastic phase angle (A) of the coloring developer and a viscoelastic phase angle (B) of the photoluminescent developer when measured at 125[° C.] using a viscoelasticity measuring device satisfy follow:

$$21.1[°] \leq (A-B) \leq 31.6[°].$$

where

A means a viscoelastic phase angle of the coloring developer,

B means a viscoelastic phase angle of the photoluminescent developer.

2. The image forming apparatus according to claim 1, wherein the viscoelastic phase angle (B) of the photoluminescent developer is less than 46.5[°], and the viscoelastic phase angle (A) of the coloring developer is 61.3[°] or more.

3. The image forming apparatus according to claim 1, wherein the viscoelastic phase angle (A) of the coloring developer is 61.3[°] or more and 68.0[°] or less.

4. The image forming apparatus according to claim 1, wherein the viscoelastic phase angle (B) of the photoluminescent developer is 36.4[°] or more and less than 46.5[°].

5. The image forming apparatus according to claim 1, wherein the viscoelastic phase angle (B) of the photoluminescent developer is 36.4[°] or more and 40.2[°] or less.

6. The image forming apparatus according to claim 1, wherein the lamination part places the second image on the print medium, and the first image on the second image such that the medium, the second image and the first image are laminated in this order.

7. The image forming apparatus according to claim 1, wherein the print medium is composed with at least a base material and an adhesive layer, which is comprised of an adhesive material, the base material has two surfaces opposing each other, wherein one of the two surfaces is a transfer surface on which the first and second images are laminated, and the adhesive layer is spread over the transfer surface such that either the first image or the second image is transferred on the adhesive layer.

8. The image forming apparatus according to claim 7, wherein the adhesive layer has two surfaces opposing each other, wherein one of the two surfaces is a contact surface that is placed facing the base material and the other is a transfer surface on which the first and second images are transferred, a surface roughness of the contact surface is greater than a surface roughness of the transfer surface.

9. The image forming apparatus according to claim 7, wherein the adhesive layer is formed of a lipophilic material.

10. The image forming apparatus according to claim 7, wherein the adhesive layer has a thickness ranged from 20 to 80 [μm].

11. The image forming apparatus according to claim 7, wherein the print medium has a thickness ranged from 100 to 160 [μm].

12. The image forming apparatus according to claim 1, wherein the lamination part is composed with a transfer belt, which is an endless belt running in a moving direction (E1), the first image forming part and the second image forming part are arranged along an outer surface of the transfer belt, and the first image forming part is positioned at an upstream side from the second image forming part with respect to the moving direction.

* * * * *